United States Patent [19]

Asou et al.

[11] Patent Number: 5,518,065
[45] Date of Patent: May 21, 1996

[54] CONTROL METHOD OF VEHICLE AIR-CONDITIONING APPARATUS

[75] Inventors: Hiroshi Asou, Hiroshima; Eiji Ukita; Yasuhiro Enno, both of Higashi-Hiroshima; Takashi Tsuchida, Hatsukaichi; Toshikazu Ishikawa, Hiroshima, all of Japan

[73] Assignees: Mazda Motor Corporation; Naldec Corporation, both of Hiroshima, Japan

[21] Appl. No.: 254,106

[22] Filed: Jun. 6, 1994

Related U.S. Application Data

[63] Continuation-in-part of Ser. No. 135,621, Oct. 14, 1993, Pat. No. 5,400,963, which is a continuation-in-part of Ser. No. 911,743, Jul. 10, 1992, abandoned, and Ser. No. 128,284, Sep. 29, 1993, Pat. No. 5,433,266.

[30] Foreign Application Priority Data

Jun. 7, 1993  [JP]  Japan ................................. 5-136206

[51] Int. Cl.$^6$ .................................................... B60H 1/00
[52] U.S. Cl. .......................... 165/43; 236/49.3; 236/91 R; 62/180
[58] Field of Search ................... 165/43, 42, 12, 165/16; 236/49.3, 91 R, 91 C, 91 F, 91 E, DIG. 9; 62/180, 186, 244

[56] References Cited

U.S. PATENT DOCUMENTS

| | | | |
|---|---|---|---|
| 4,914,924 | 4/1990 | Takahashi | 63/133 |
| 4,930,698 | 6/1990 | Takekawa et al. | 236/49.3 |
| 5,148,977 | 9/1992 | Hibino et al. | 236/49.3 |
| 5,165,595 | 11/1992 | Horio et al. | 236/49.3 |
| 5,167,365 | 12/1992 | Mitoshi et al. | 236/49.3 |
| 5,170,935 | 12/1992 | Federspiel et al. | 236/91 C X |
| 5,172,856 | 12/1992 | Tanaka et al. | 236/49.3 |
| 5,186,682 | 2/1993 | Iida | 165/43 X |
| 5,187,943 | 2/1993 | Taniguchi et al. | 62/180 |

FOREIGN PATENT DOCUMENTS

| | | |
|---|---|---|
| 3610962 | 6/1990 | Germany . |
| 4119042 | 12/1991 | Germany . |
| 4121124 | 1/1992 | Germany . |
| 57-77216 | 5/1982 | Japan . |
| 62-8327 | 2/1987 | Japan . |
| 5-116521 | 5/1993 | Japan . |

*Primary Examiner*—Harry B. Tanner
*Attorney, Agent, or Firm*—Keck, Mahin & Cate

[57] ABSTRACT

An air conditioning control method of a vehicle includes the step of determining a target temperature of a passenger compartment of the vehicle, calculating a comfort index provided as a function of at least an outlet air temperature and outlet air volume flowing out of a heater-air-conditioner system in which air is treated to be introduce to a passenger compartment, setting a target comfort index, determining an optimized combination of the output air temperature and the output air volume which minimizes a deviation of the comfort index from the target comfort index, compensating the target temperature to reduce the deviation when the deviation is greater than a predetermined value. The optimized comfort level can be accomplished quickly through the control.

36 Claims, 16 Drawing Sheets

Tr: INTERIOR TEMP.
Ta: AMBIENT AIR TEMP.
Ts: SOLAR RADIATION-TEMP.
Te: COOLING COIL OUTLET TEMP.
Tw: COOLING WATER TEMP.
θ: AIR MIX DAMPER OPENING
TSET: MANUAL PRESET TEMP.

FIG. 12
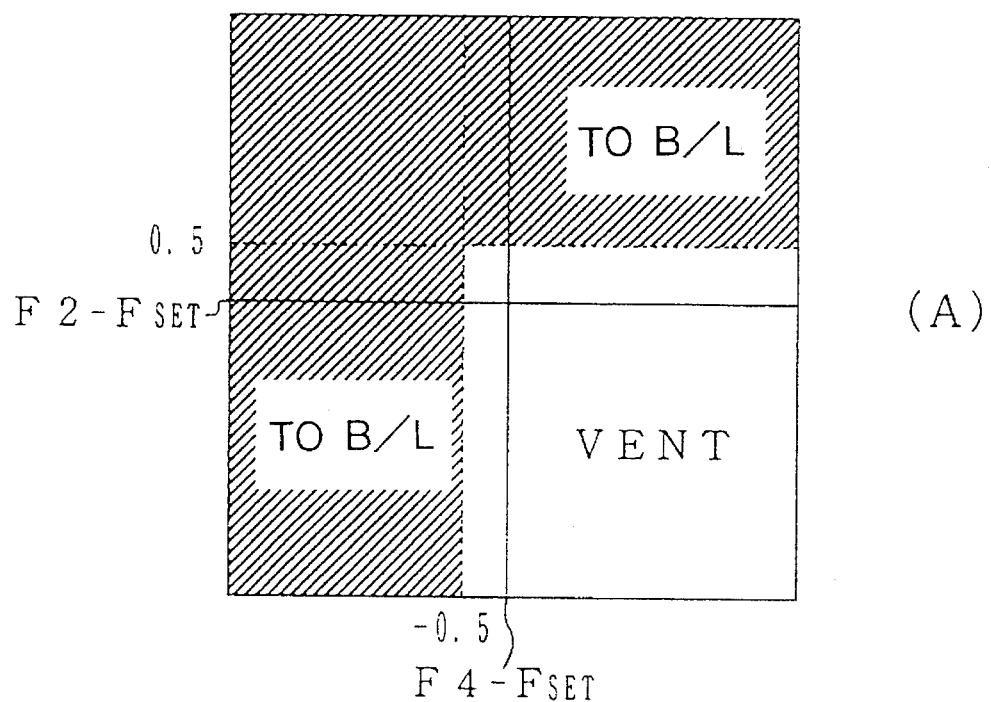
(A)
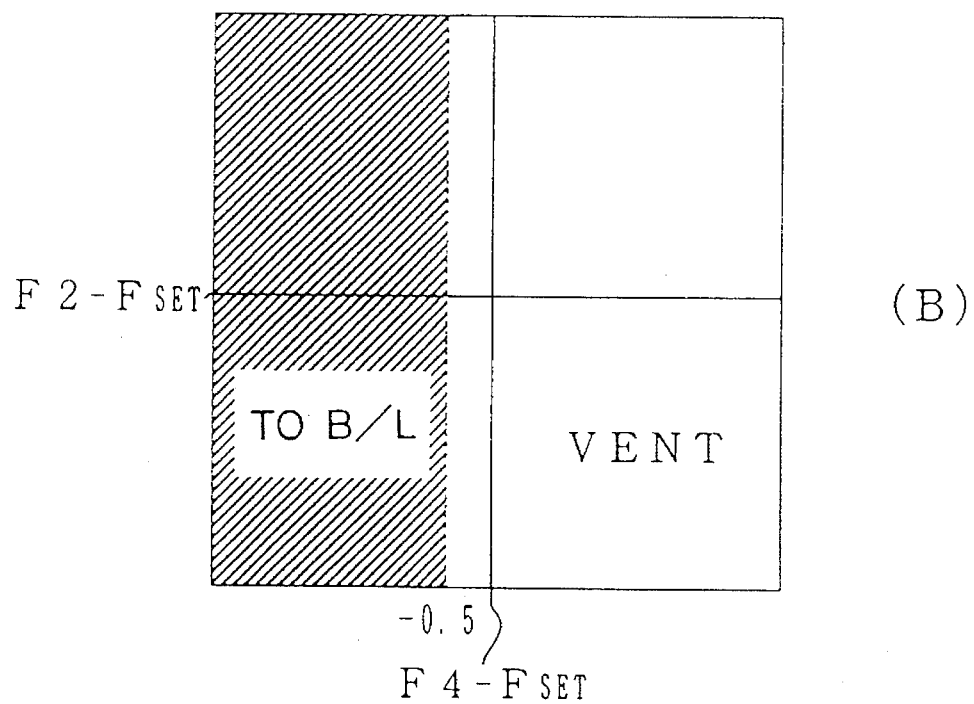
(B)

FIG. 14
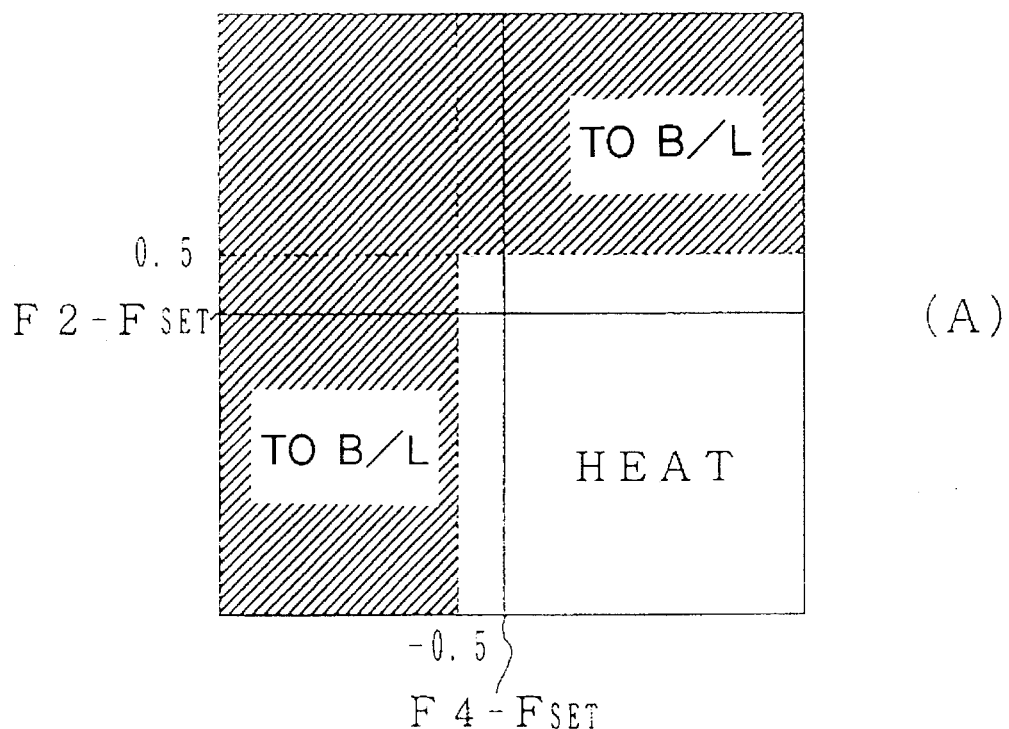
(A)
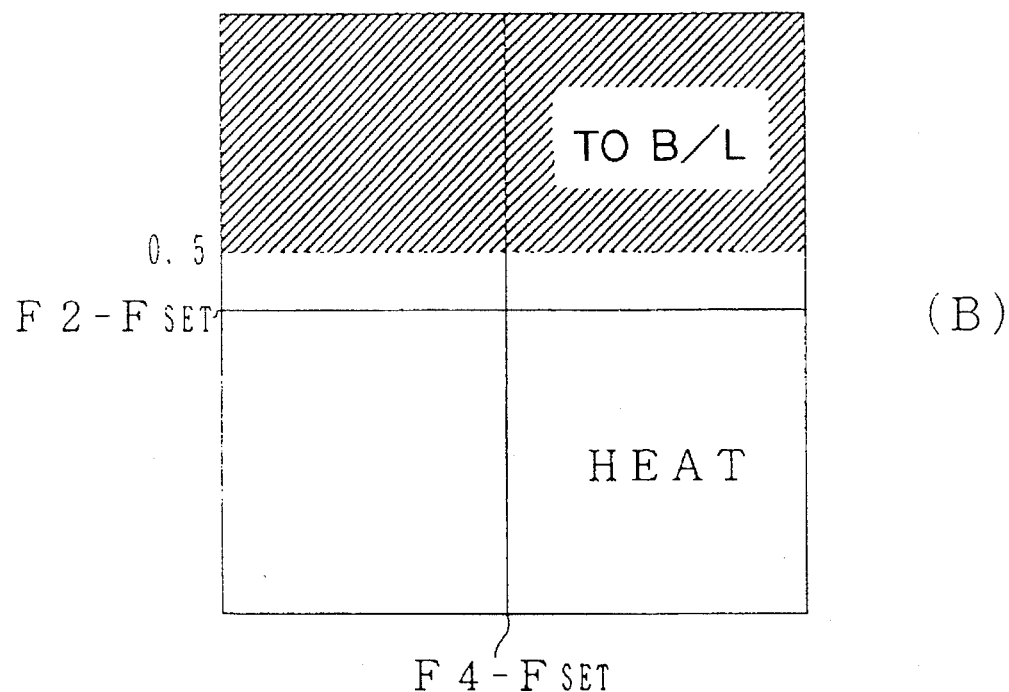
(B)

CONTROL METHOD OF VEHICLE AIR-CONDITIONING APPARATUS

CROSS-REFERENCE TO RELATED APPLICATIONS

The present invention is a continuation-in-part of U.S. patent application Ser. No. 08/135,621 filed on Oct. 14, 1993, U.S. Pat. No. 5,400,963, which is a continuation-in-part of U.S. patent application Ser. No. 07/911,743 filed on Jul. 10, 1992 and now abandoned, and U.S. patent application Ser. No. 08/128,284 filed on Sep. 29, 1993 now U.S. Pat. No. 5,433,266. Both of the parent applications are assigned to the same assignee as the present application.

BACKGROUND OF THE INVENTION

1. Field of the Invention

The present invention generally relates to an air conditioning system and method for a vehicle, and more specifically, to an air-conditioning control of a vehicle which can heat and cool the air to be introduced into a passenger compartment by means of a temperature control unit so as to accomplish a desired temperature of a passenger compartment of a vehicle.

2. Related Art

Generally, in a vehicle equipped with an automatic temperature control system or a heater-air-conditioner system, a heat balance between a heat exchange capacity of the temperature control system and the heat load therefor is controlled to maintain a desirable temperature of the passenger compartment.

For example, the heat balance during cooling operation can be defined by the following equation:

$$Qa=Qu-Qs-Qm-Qe \quad (1)$$

Wherein Qa is the heat-exchange capacity of the heater-air-conditioner system, Qu is a transmission loss due to the temperature difference between the ambient temperature and the passenger compartment temperature, Qs is a heat load caused by the solar radiation, Qm is a heat load dissipated from the human bodies of passengers, and Qe is a heat load dissipated from equipments in the vehicle, such as an internal-combustion engine. Further, Qa, Qu, Qs are given by the following equations:

$$Qa=Cp*\Gamma*Va(To-Tr)$$

$$Qu=K*A(Tr-Ta)$$

$$Qs=Ks*Ts$$

Wherein
- Va: Outlet Air Volume of Blower (Delivery Air Volume of Blower);
- To: Outlet Air Temperature of Heater-Air-Conditioner System;
- Tr: Interior Temperature of Passenger Compartment
- Ta: Ambient Air Temperature (Outdoor Air Temperature)
- Ts: Reduced Temperature of Solar Radiation
- Cp: Specific Heat of Air at Constant Pressure
- Γ: Specific Gravity of Air
- K: Overall Heat Transfer Coefficient
- A: Heating Surface Area
- Ks: Conversion Coefficient for Converting Solar Radiation to Temperature.

In the above-mentioned formula (1), assuming Qm, Qe to be C(constant) since Qm and Qe can be considered as being approximately constant values, the equation (1) can be rewritten into the following equation:

$$Cp*\Gamma*Va(To-Tr)=K*A(Tr-Ta)-Ks*Ts-C \quad (2)$$

If the interior temperature Tr is substantially equal to a preset temperature TSET which is manually set by the passenger, this equation can be further rewritten in to the following equation:

$$Cp*\Gamma*Va(To-TSET)=K*A(TSET-Ta)-Ks*Ts-C \quad (3)$$

Thus, the desired values of the outlet air volume Va and the outlet air temperature To can be obtained from the above-mentioned equation (3) and the outlet air volume Va and the outlet air temperature To of the heater-air-conditioner system is converged to the desired values, respectively, whereby the interior temperature Tr can be maintained substantially at the preset temperature TSET. However, the above-mentioned equation includes two variables, that is, the outlet air volume Va and the outlet air temperature To, and therefore, it is difficult to obtain the really desired values of the volume Va and the temperature To directly or uniformly from the above equation (3).

In a heater-air-conditioner system disclosed in Japanese Patent Publication No. 62-8327 (Application No. 54-57215), the relationship between the outlet air volume and an environmental factor such as the ambient air temperature is predetermined, and the outlet air volume is determined in accordance with a detected environmental factor. Then, a desired outlet air temperature is computed from the determined outlet air volume, and the opening degree of an air-mixing door or damper is controlled so as to obtain the outlet air temperature.

Further, Japanese Patent Application Laid-Open Publication No. 57-77216 (Application No. 55-153718) discloses a heater-air-conditioner system in which an optimum outlet air temperature can be determined in accordance with a preset desired interior temperature, a detected ambient air temperature and a detected interior temperature.

In the system disclosed in the above-mentioned Japanese Publication No. 62-8327, and intended outlet air volume may be controlled, however the outlet air temperature is uncontrollable. On the contrary, according to the system disclosed in Japanese Laid-Open Publication No. 57-77216, an intended outlet air temperature may be controlled, but the outlet air volume is uncontrollable.

In particular, since a passenger in a vehicle tends to take a position relatively near to air outlets of a heater-air-conditioner system, an air flow of an excessively high or low outlet air temperature and/or an excessively high or low outlet air volume gives a discomfort the passengers, and therefore, such a system cannot meet passengers' requests for a comfortable air condition. Further, an effective temperature which a passenger feels relates to both the outlet air volume and the outlet air temperature. Where one of the outlet air volume and temperature is selected to be controlled and the other is left uncontrolled, the effective temperature would often come off from a desirable zone of the interior temperature.

The present inventors have already proposed a comfort index as a generic indication incorporating heating-air-conditioning factors such as the ambient air temperature, the interior temperature, and the solar radiation, and in Japanese Patent Application No. 3-170015, laid open to the public on May 14, 1993, which corresponds to the pending U.S. patent application Ser. No. 08/135,621, a vehicle air-conditioning system in which the operating conditions can be set in accordance with this comfort index. In this air-conditioning system, both of the outlet air temperature and the outlet air volume are determined so that the comfort index, which is set totally in consideration with various kinds of heating-air-conditioning factors, is controlled to a predetermined value. Then, a blower and a mixing door or damper in the air-conditioning system are controlled in order to regulate the outlet air temperature and the outlet air volume.

It should however be noted that the above proposed air conditioning system is disadvantageous in the following points. The target value of the comfort is fixed at a predetermined value. On the other hand, an effective comfort index which a passenger actually feels varies based on for example, the difference in individuals, climate and the like. Thus, the proposed system cannot reach the effective comfort which varies depending on the above factors and there is a need for a sophisticated air conditioning control.

SUMMARY OF THE INVENTION

Accordingly, one object of the present invention is to provide a vehicle air-conditioning method in which both the outlet air temperature and the outlet air volume can be widely and desirably controlled so as to satisfy a passenger's comfort.

Another object of the present invention is to provide a vehicle air conditioning control method which can compensate the individual difference in comfort which depends on the passengers.

It is further object of the present invention to provide a system for the same.

The forgoing and other objects and advantages are accomplished, according to the present invention, by an air conditioning control method of a vehicle comprising, determining a target temperature of a passenger compartment, calculating a comfort index provided as a function of at least the outlet air temperature and outlet air volume from the temperature controller, setting a target comfort index, determining an optimized combination of the output air temperature and the output air volume which minimizes a deviation of the comfort index from the target comfort index, compensating the target temperature to reduce the deviation when the deviation is greater than a predetermined value.

Preferably, the target comfort index is changeable as a function of a set temperature of a passenger compartment. Further, where the deviation does not reduce irrespective of the compensation of the target temperature, an airflow mode of the output air is changed.

In a preferred embodiment of the invention, the comfort index can be calculated as a function of air conditioning factor such as the outlet air volume, output air temperature To, and an environmental factor such as outside temperature Ta, passenger compartment temperature Tr, solar radiation value.

The comfort index is calculated by the following formula:

$$F=K1*Va+K2*To+K3*Ta+K4*Tr+K5*Ts+K6$$

wherein K1 through K6 are weighting coefficients for the respective variables.

In a preferred embodiment of the present invention, the airflow mode which differs between summer (an air cooling operation) and winter (an air heating operation) is taken into account. For this purpose, weight coefficients K11–K61 for summer and K12–K61 for winter are differently provided. Thus, the comfort indexes F2 for summer and F4 for winter are determined respectively in accordance with the above formula.

Further, preferably, an overall comfort is determined taking account of both the comfort indexes F2 and F4 then air conditioning is performed to control the overall comfort to the target value.

In another preferred embodiment, the target temperature is increased and reduced stepwise or steplessly to a predetermined temperature so as to accomplish the target comfort index.

Preferably, the airflow mode in an air cooling operation of the heater-air-conditioner system is different from that in an air heating operation of the system.

A comfort index F2 in the air cooling operation of the heater air-conditioner system is provided by the following formula:

$$F2=K11*Va+K21*To+K31*Ta+K41*Tr+K51*Ts+K61$$

Wherein K11–K61 are weight coefficients.

A comfort index F4 in the air heating operation of the heater air-conditioner system is provided by the following formula:

$$F4=K12*Va+K22*To+K32*Ta+K42*Tr+K52*Ts+K62$$

Wherein K12–K62 are weight coefficients.

An overall comfort index F3 is provided as follow;

$$F3=\alpha*F2+(1-\alpha)F4,$$

wherein θ:weight coefficient.

The airflow mode is selectively established among a vent mode in which the air from the heater-air-conditioner system mainly flows out of an upper outlet of the system, a heat mode in which the air mainly flows out of a lower outlet and a B/L mode in which the air flows out of both the upper outlet and lower outlet with a predetermined ratio therebetween. The airflow mode is switched to the vent mode when either the deviation of the index F2 or F4 from the target comfort index is greater than a predetermined value. In a specific condition, the airflow mode is switched to the heat mode when either the deviation of the index F2 or F4 from the target comfort index is less than a predetermined value.

If the deviation of the index F2 from the target comfort index is not greater than a predetermined value and if the deviation of the index F4 from the target comfort index is not smaller than a predetermined value, the vent mode maintained.

Further, the airflow mode is switched from the vent mode to the B/L mode in accordance with an opening of a damper which controls an air flow rate between a heater and an air conditioner of the system in a case where the deviation of the comfort index F2 from the target comfort index is greater than a predetermined value. In addition, the air flow mode is switched from the vent mode to the B/L mode in accordance with an opening of a damper which controls an air flow rate between a heater and an air conditioner of the system in a case where the deviation of the comfort index F4 from the target comfort index is greater than a predetermined value. The airflow mode is switched from the heater mode to the B/L mode in accordance with an opening of a damper which controls an air flow rate between a heater and an air conditioner of the system in a case where the deviation of the comfort index F2 from the target comfort index is greater than a predetermined value.

The airflow mode is switched from the heater mode to the B/L mode in accordance with an opening of a damper which controls an air flow rate between a heater and an air conditioner of the system in a case where the deviation of the comfort index F4 from the target comfort index is greater than a predetermined value.

In another aspect of the invention, an air conditioning control apparatus of a vehicle is provided. The apparatus comprises a target temperature determining device which determines a target temperature of a passenger compartment of the vehicle, a comfort index setting device which calculates a comfort index provided as a function of at least an outlet air temperature and outlet air volume flowing out of a heater-air-conditioner system in which air is treated to be introduce to a passenger compartment, a target comfort index setting device which sets a target value of the comfort index, an output setting device which determines an optimized combination of the output air temperature and the output air volume which minimizes a deviation of the comfort index from the target comfort index, a compensator which compensates the target temperature to reduce the deviation when the deviation is greater than a predetermined value.

The above and other objects, advantages and novel features of the present invention will become fully apparent from the following detailed descriptions taking reference with the accompanying drawings.

BRIEF DESCRIPTION OF THE DRAWINGS

FIGS. 12(A) and 12(B) are charts showing how to determine the air flow mode;

FIGS. 14(A) and 14(B) are charts showing how to determine the air flow mode;

DETAILED DESCRIPTION OF THE PREFERRED EMBODIMENTS

A preferred embodiment according to the present invention will be described in detail hereinbelow.

Figure 1:
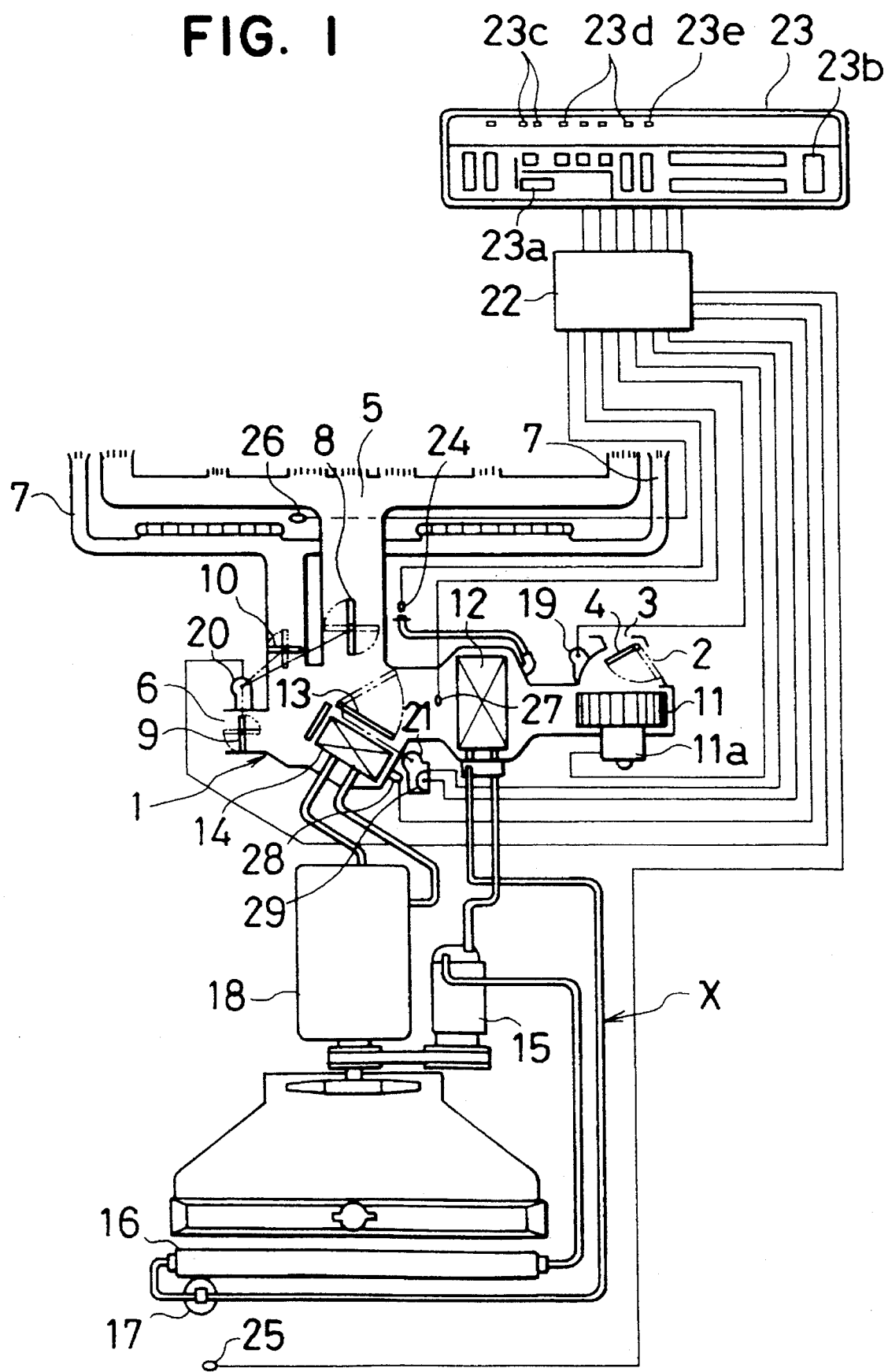
FIG. 1 is a schematic view showing the overall arrangement of the vehicle heater-air-conditioner system of the embodiment according to the present invention.

FIG. 1 is a schematic view showing the arrangement of the vehicle heater-air-conditioner system.

Referring to FIG. 1, the heater-air-conditioner system comprises a ventilation duct 1, an outside air intake 2 for introducing outdoor fresh air in an upstream part of the duct 1, an interior air intake 3 for introducing recirculation air the upstream part of the duct 1, and outside air change-over door or damper 4 for selectively controlling the opening and closing of the air intakes 2, 3.

Further, the downstream part of the ventilation duct 1 is provided therein with a vent outlet 5, a foot outlet 6 and a defroster outlet 7, and three mode change-over doors or dampers 8, 9, 10 for selectively directing conditioned air to the outlets 5, 6, 7 therethrough.

A blower 11 of variable volume type is disposed in the upstream part of the ventilation duct 1, so that intake air introduced through the interior air intake 3 and/or the outside air intake 2 flows out into the passenger compartment through the duct 1 and the outlets 5, 6, 7 by means of an action of the blower 11.

The system further includes a cooling heat-exchanger 12 and a heating heat-exchanger 14, which are disposed in series in the ventilation duct 1. The cooling heat-exchanger 12 is disposed downstream of the blower 11 and the heating heat-exchanger 14 is disposed downstream of the cooling heat-exchanger 12. The cooling heat-exchanger 12, which is a cooling coil or evaporator, is connected to a coolant circuit X including a compressor 15, a condenser 16 and receiver 17, so that the heat-exchanger 12 is connected or disconnected to a rotary element of an internal-combustion engine 18 in accordance with ON/OFF operation of an electromagnetic clutch. Further, the heating heat-exchanger 14 is arranged to be a heater core through which coolant or cooling water from an engine cooling system of the engine 18 is circulated. The flow of the cooling water fed to the heating-exchanger 14 is controlled by a flow control valve (not shown) so as to be regulated in association with an air-mixing door or damper 13.

The air mixing damper 13 is disposed between the cooling heat-exchanger 12 and the heating heat-exchanger 14 so that the air flow through the heating heat-exchanger 14 is controlled by the opening position of the air mixing damper 13, which can be moved to allow full air flow (real line), or no air flow (phantom line), or any position in between (not shown). Therefore, the mixing ratio of the air flow to be heated through the heating heat-exchanger 14 with respect to the air flow bypassing the heat-exchanger 14 is adjusted. The opening degree θ (0–1) of the air mixing damper 13 is indicated by "1" when the entire air flow passes through the heating heat-exchanger 14, that is, when the rate of air flow passing through the heating heat-exchanger 14 is 100%, whereas the opening degree θ is indicated by "0" if the entire air flow bypasses the heating heat-exchanger 14, that is, if the rate of air flow passing through the heating heat-exchanger 14 is 0%. The outlet air temperature To is determined by the above-mentioned mixing ratio, and therefore, it can be steplessly adjusted between the highest temperature obtained in a case of the opening degree θ=1 and the lowest temperature obtained in the opening degree θ=0.

The opening degree θ of the above-mentioned air mixing damper 13 is defined by the following formula:

$$\theta=(To-Te)/(Kw*Tw-Te) \tag{5}$$

wherein

Te: Outlet Air Temperature of Cooling Heat-Exchanger 12;

Tw: Engine Cooling Water Temperature;

Kw: Coefficient for Converting Engine Cooling Water Temperature into Outlet Air Temperature of Heating Heat-exchanger 14.

The system further comprises motors, which serve as devices for driving the above dampers, that is, an electric motor 19 for moving the interior air/outside air change-over dampers 8, 9, 10, and a servo-motor 21 for moving the air mixing damper 13. Further, the system includes control means for controlling the operation of the system, that is, a controller 22 for controlling the above-mentioned motors 19, 20, 21 and the output air volume of the blower 11, and a control panel 23 for manually setting air-conditioning factors. The control panel 23 is provided with various switches, adjusters and the like which can be manipulated by the passenger, such as an automatic switch 23a for selecting either of an automatic air-conditioning control mode or a manual air-conditioning control mode, an interior temperature setting adjuster 23b for manually setting the interior temperature TSET at a desired value, an interior and outside air adjuster 23c for manually setting the introduction rate of interior air outside air, and an airflow mode switch 23d for selecting an airflow mode, and a defroster adjuster 23e for manually setting the opening degree of the defroster outlet 7. The interior temperature setting adjuster 23b may be a digital push switch which allows the passenger to stepwise increase or decrease a desired interior temperature within a certain range such as from 18 to 32 centigrade, e.g., in the order of every 0.5 centigrade, or a slide adjuster of variable resistor type which allows linear setting of a desired interior temperature.

Figure 2:
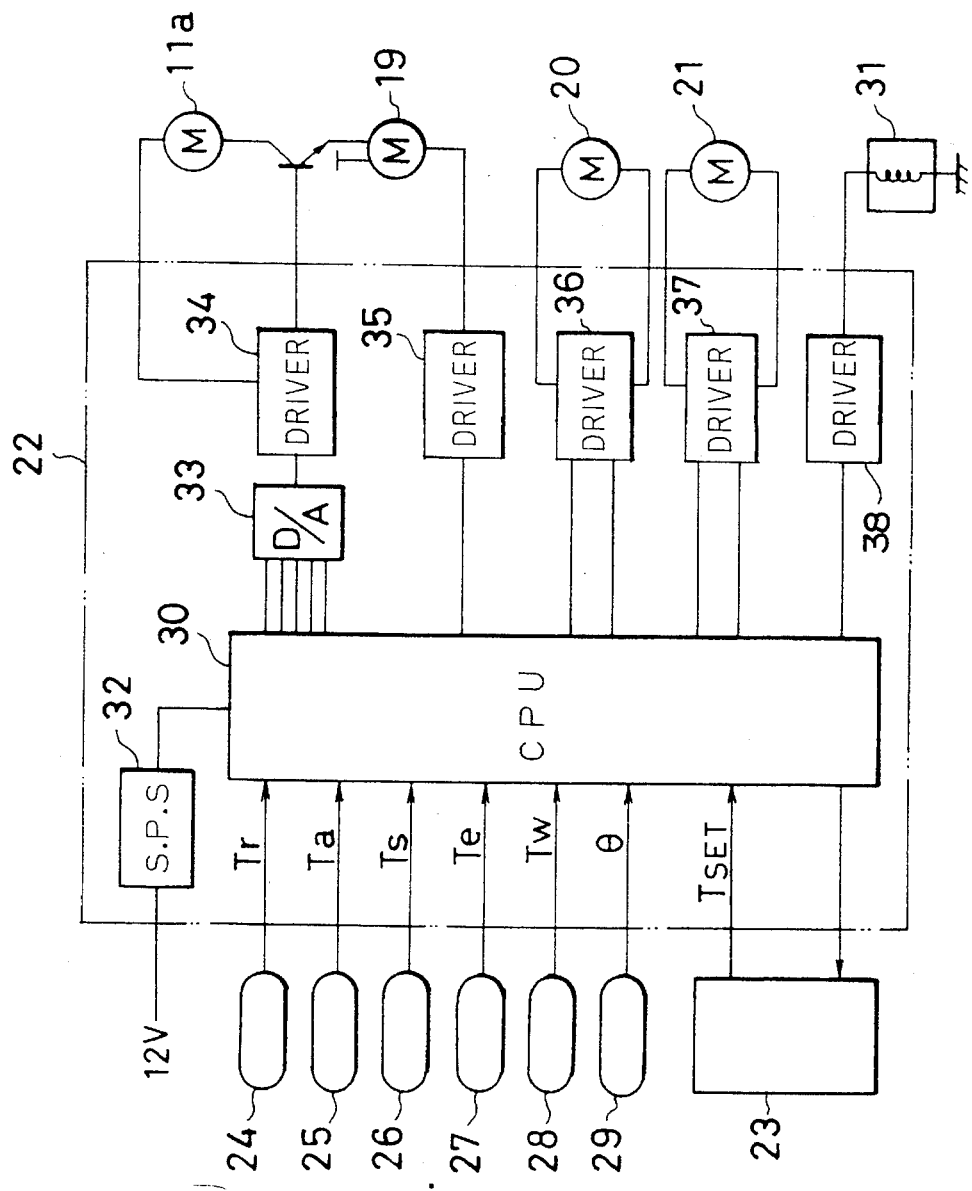
FIG. 2 is a diagrammatic view showing the entire arrangement of a control device.

FIG. 2 is a diagrammatic view showing the arrangement of the controller 22.

In this embodiment, a microcomputer incorporating CPU, RAM, ROM (not shown) and the like is used as the controller 22. The controller 22 has a microprocessor (which will be hereinbelow denoted as "CPU") 30 is connected to a stabilized power supply (S.P.S) 32, and is adapted to drive the above-mentioned motors 19, 20, 21 by means of drivers 35 to 37 and to control the engagement and disengagement of the electromagnetic clutch 31 incorporated between the compressor 15 and the engine 18 by means of a driver 38. Under the control of the motors 19, 20, the airflow mode of the system is changed or maintained, and under the control of the servo-motor 21, the opening degree $\theta$ of the air mixing damper 13 is adjusted.

The control device 22 drives a blower motor 11a through a D/A converter 33 and a driver 34, and under the control of voltage applied to the blower motor 11a, the delivery air volume of the blower 11, which substantially corresponds to the air volume, is controlled so that the output air volume Va of the system.

Further, the system comprises various kinds of sensors for detecting environmental factors, such as an interior temperature sensor 24 for detecting the temperature of recirculated air sucked into the ventilation duct 1 as being the interior temperature Tr, and outside temperature sensor 25 for detecting the ambient air temperature Ta, a solar radiation sensor 26 for detecting the solar radiation value, a duct sensor 27 for detecting the outlet temperature Te of the cooling heat-exchanger 12, a water temperature sensor 28 for detecting the temperature of engine cooling water, and a potentiometer 29 for detecting the opening degree $\theta$ of the air mixing damper 13. These sensors are connected to control device 22 and the results sensed by the sensors 24–29 are inputted to the CPU.

Figure 3:
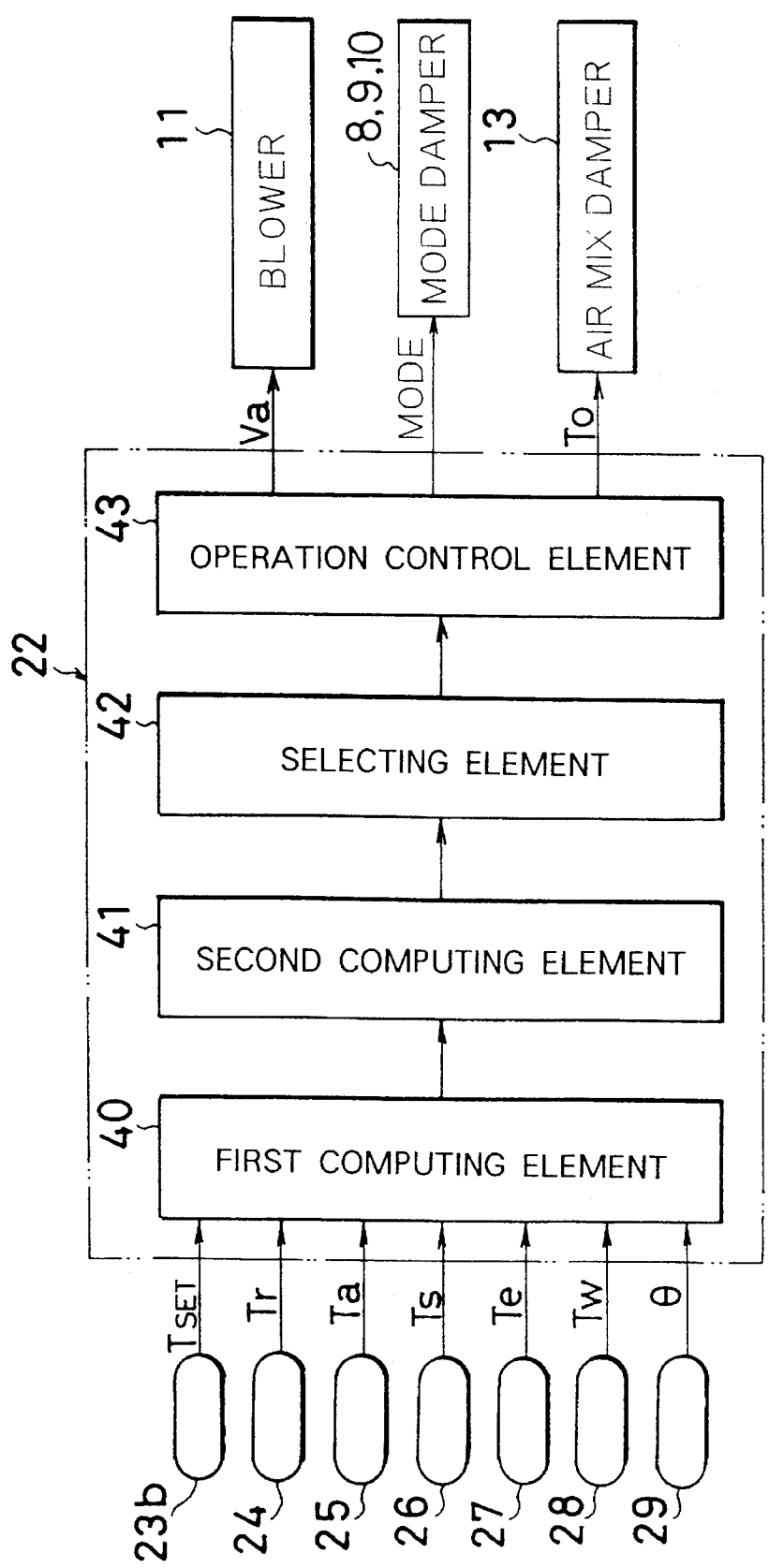
FIG. 3 is a diagrammatic view functionally showing the arrangement of the control device.

FIG. 3 is a diagrammatic view functionally showing the arrangement of the control device 22.

The control device 22 is provided with a first computing element 40 receiving detection signals delivered from the above-mentioned sensors 24 to 29 and the signals from the switches or adjusters 23a to 23e on the control panel 23. The first computing element 40 computes basic parameters (To, Va) for maintaining the interior temperature Tr at the preset value TSET, accordingly obtains a correlation between the outlet air temperature To and the outlet air volume Va. This correlation between the temperature To and the volume Va is defined by the above-mentioned thermal balance equation (3), that is, Cp*Γ*Va(To–TSET)=K*A(TSET–Ta)–Ks*Ts–C.

The control device 22 further comprises a second computing element 41 for computing a comfort index F.

A comfort which a passenger feels in the vehicle can be expressed by a comfort index F which can be mathematically calculated based on heating-air-conditioning factors (outlet air temperature To and outlet air volume Va) and circumstantial factors (ambient air temperature Ta, interior temperature (passenger compartment temperature) Tr and solar radiation value Ts).

The comfort index F can be calculated by the following formula which has been obtained by evaluation tests:

$$F=K1*Va+K2*To+K3*Ta+K4*Tr+K5*Ts+K6 \tag{4}$$

wherein K1 through K6 are weighting coefficients for the respective elements. The control device 22 stores two kinds of weight coefficients. Namely, the weight coefficients K11–K61 for summer and K12–K62 for winter are differently stored in the control device 22 as a predetermined value which is experimentally obtained. Thus, the comfort indexes F2 for summer (cooling operation) using the weight coefficients K11–K61 and F4 for winter using the weight coefficients K12–K62 (heating operation) are determined respectively as follows.

$$F2=K11*Va+K21*To+K31*Ta+K41*Tr+K51*Ts+K61 \tag{5}$$

$$F4=K12*Va+K22*To+K32*Ta+K42*Tr+K52*Ts+K62 \tag{6}$$

The comfort indexes F2 and F4 vary from 1 to 9 in accordance with the air conditioning factor and environmental factor.

Generally, the comfort index F, in which the passenger feels relatively cold, is set to be "1", and the comfort index F, in which the passenger feels relatively hot, is set to be "9". The comfort index F, wherein the passenger generally feels comfortable, is set to be an optimum value such as "5". The above-mentioned factors K1 to K5 are experimentally determined so that the comfort index F, with which the passenger senses the most comfortable condition, results in the optimum value "5". Thus, as the comfort index F increases, for example, in the comfort index F=7 to 9, an atmosphere is indicated in which the passenger senses a hotter condition.

On the other hand, as the comfort index decreases, for example, in the comfort index F=1 to 3, and atmosphere is indicated in which the passenger senses a colder condition.

The summer comfort index F2 weighs the comfort of an upper body portion of the passenger such as a head. In other word, as the index F2 is reduced, the passenger feels colder in his upper body portion such as head. On the other hand, as it is increased, the passenger feels hotter in his upper body. To the contrary, the winter comfort index F4 weighs the comfort of a lower body portion of the passenger, such as legs. Namely, as the index F4 is reduced, the passenger feels colder in his lower body portion, such as his legs. On the other hand, as the index F4 is increased, the passenger feels hotter in his legs.

Further, the control device includes a selecting element 42 which determines the outlet air temperature To, the outlet air volume Va and the airflow mode so as to control the comfort indexes F2 and F4 to the target comfort index value FSET, and an operation control element 43 for controlling the opening degree θ of the air mixing damper 13 and the delivery volume of the blower 11, and positions of the switching dampers 8, 9 and 10 in accordance with the temperature To and the volume Va which are determined by the selecting element 42.

Explanation will be made in respect of the control mode of the system in this embodiment with reference to FIGS. 4 and 10.

Figure 4:
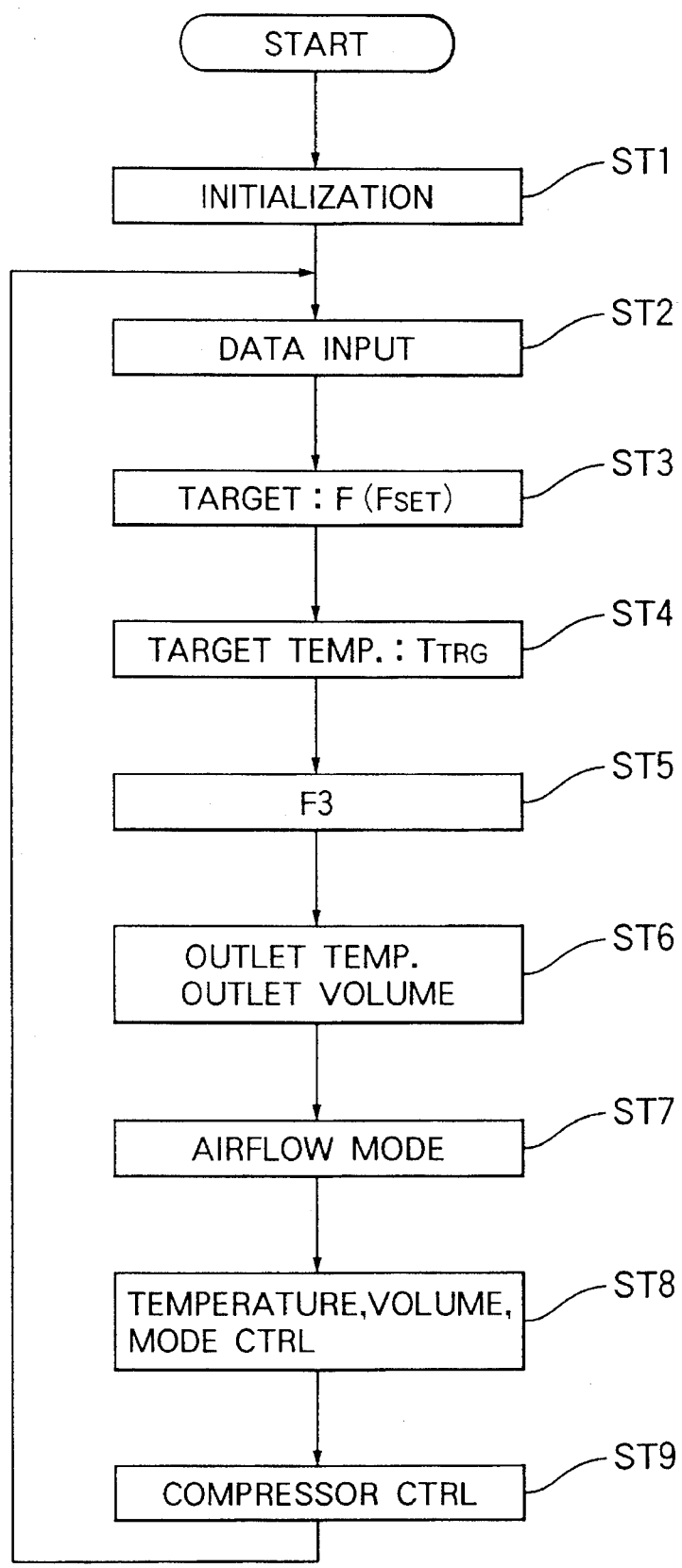
FIG. 4 is a flow-chart showing a basic flow of heating-air-conditioning control carried out by the control device.

FIG. 4 is a flow-chart showing a basic flow of the air-conditioning control carried out by the control device 22. After initial setting (step ST1), the control device 22 reads values detected by the sensors 24 to 29 (ST2).

Further, the control device 22 computes a target value FSET of the comfort index F, based on the interior temperature TSET preset by the passenger through the interior temperature setting adjuster 23b (ST3 and ST4).

The control device 22 calculates a target temperature TTRG which is a desirable and stable value of the interior temperature Tr, and further calculates the overall comfort index F3 which is obtained by totally assessing the comfort indexes F2 and F4.

Further, the control device 22 calculates the outlet air temperature To and the outlet air volume Va so as to control the overall comfort index F3 to the target value FSET (ST6), and control the opening θ of the damper 13, the delivery of the blower 11 and the positions of the dampers 8, 9 and 10 (ST8). Further, the control device 22 controls the compressor 15 (ST9).

Figure 5:
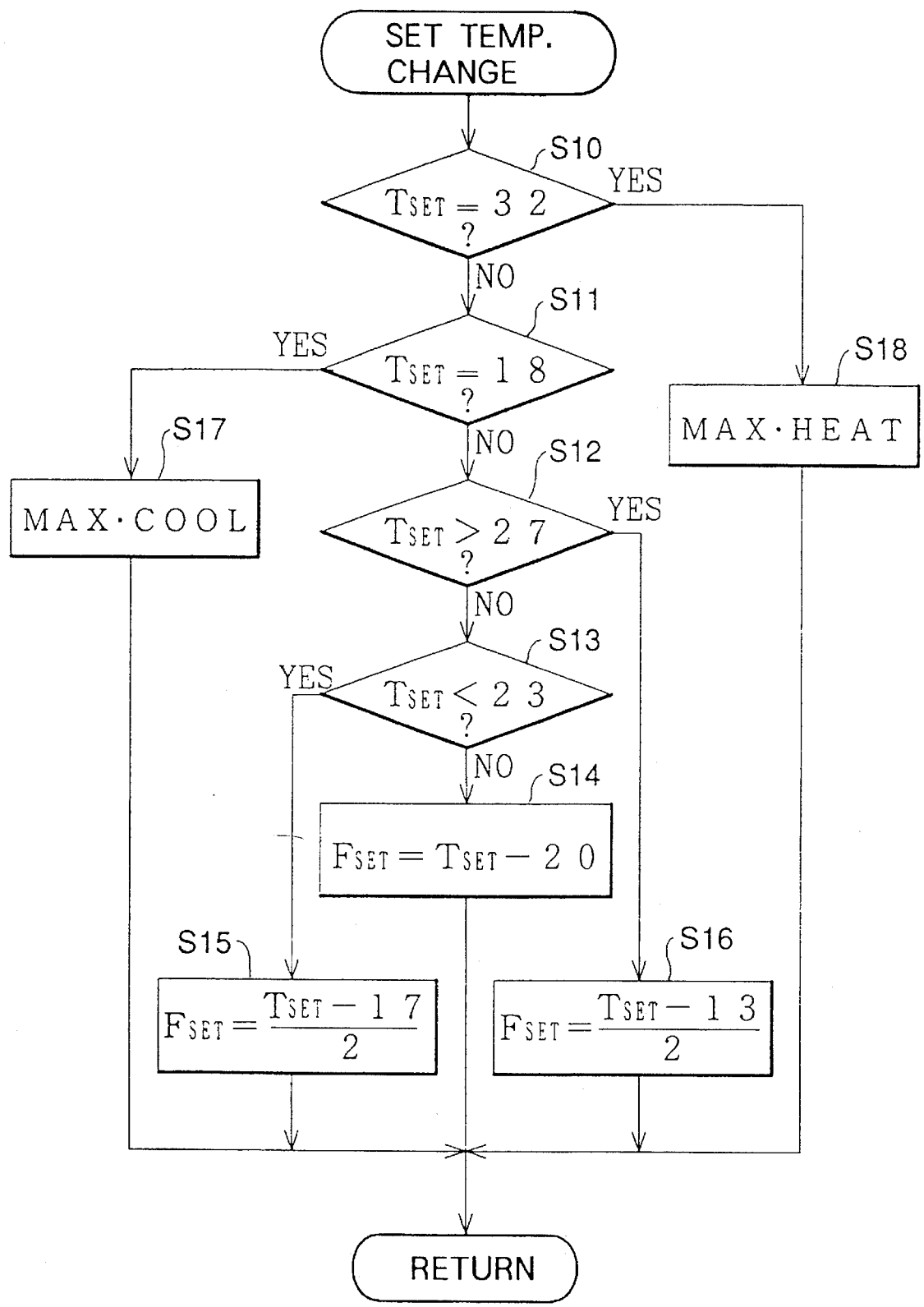
FIG. 5 is a flow chart showing a subroutine for setting a target comfort index.
Figure 6:
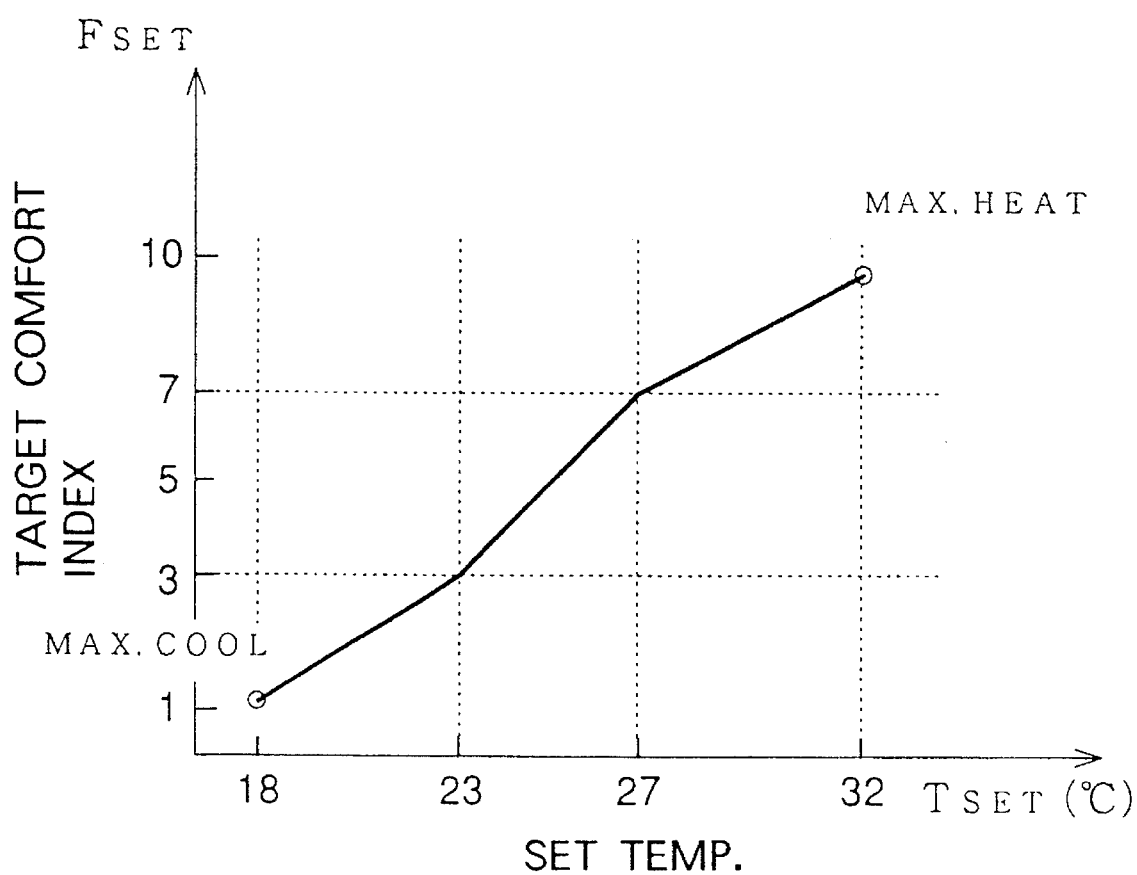
FIG. 6 is a chart of a set interior temperature and the target comfort index.

FIG. 5 is a flow chart showing a subroutine for setting a target value FSET of the comfort index F and FIG. 6 is a chart showing a relationship between the set interior temperature TSET and the target comfort index FSET.

Where the set temperature TSET manually set by a passenger is in a proper range such as from 18 to 32 centigrade, The control device 22 sets the operation mode of the system at the maximum cooling operation mode (MAX.COOL) or the maximum heating operation mode (MAX.HEAT) (S10, S11, S17 and S18). For example, when the engine starts in winter, the passenger would set the set interior temperature TSET at the maximum value, such as 32 centigrade. In this case, the system is operated in accordance with the full automatic heating operation mode without taking account of the comfort index (S10, S18). Namely, the damper 13 is set at the full opening position (θ=1), the flow rate of the engine coolant is set at the maximum rate, and the flow rate of the blower 11 is also maximized.

On the other hand, when the engine starts in summer, the passenger would set the set interior temperature TSET at the minimum value, such as 18 centigrade to cool the interior temperature Tr as quickly as possible. In this case, the system is operated in accordance with the full automatic cooling operation mode without taking account of the comfort index (S11, S17). Namely, the damper 13 is set at the fully closed position (θ=0), all the engine coolant is introduced to the cooling heat-exchanger 12. Further, the compressor is operated at its full load and the flow rate of the blower 11 is also maximized.

In another case where the set interior temperature TSET is set at a value between minimum value (18 centigrade) and maximum value (32 centigrade), the target comfort index FSET is changeably set in accordance with the set interior temperature TSET (S12–S16). Where the set interior temperature TSET is set in a first range, for example, a range between 18 and 23 centigrade, the target comfort index FSET is provided by a formula:FSET=(TEST-17)/2 (S12, S13 and S15). Where the set interior temperature TSET is set in a second range, for example, a range between 23 and 27 centigrade, the target comfort index is provided by a formula:FSET=(TSET-20) (S12, S13 and S14). And where the set interior temperature TSET is set in a third range, for example, a range between 27 and 32 centigrade, the target comfort index is provided by a formula:FSET=(TSET-13)/2 (S12 and S16).

The target comfort index obtained through the above procedure is shown in FIG. 6.

As the set interior temperature TSET in the rage between the 18 and 27 centigrade is increased, the index FSET is gradually increased within the range of 1 through 9. For example, where the temperature TSET is set at 25 centigrade, the target comfort index is set at 5.

Figure 7:
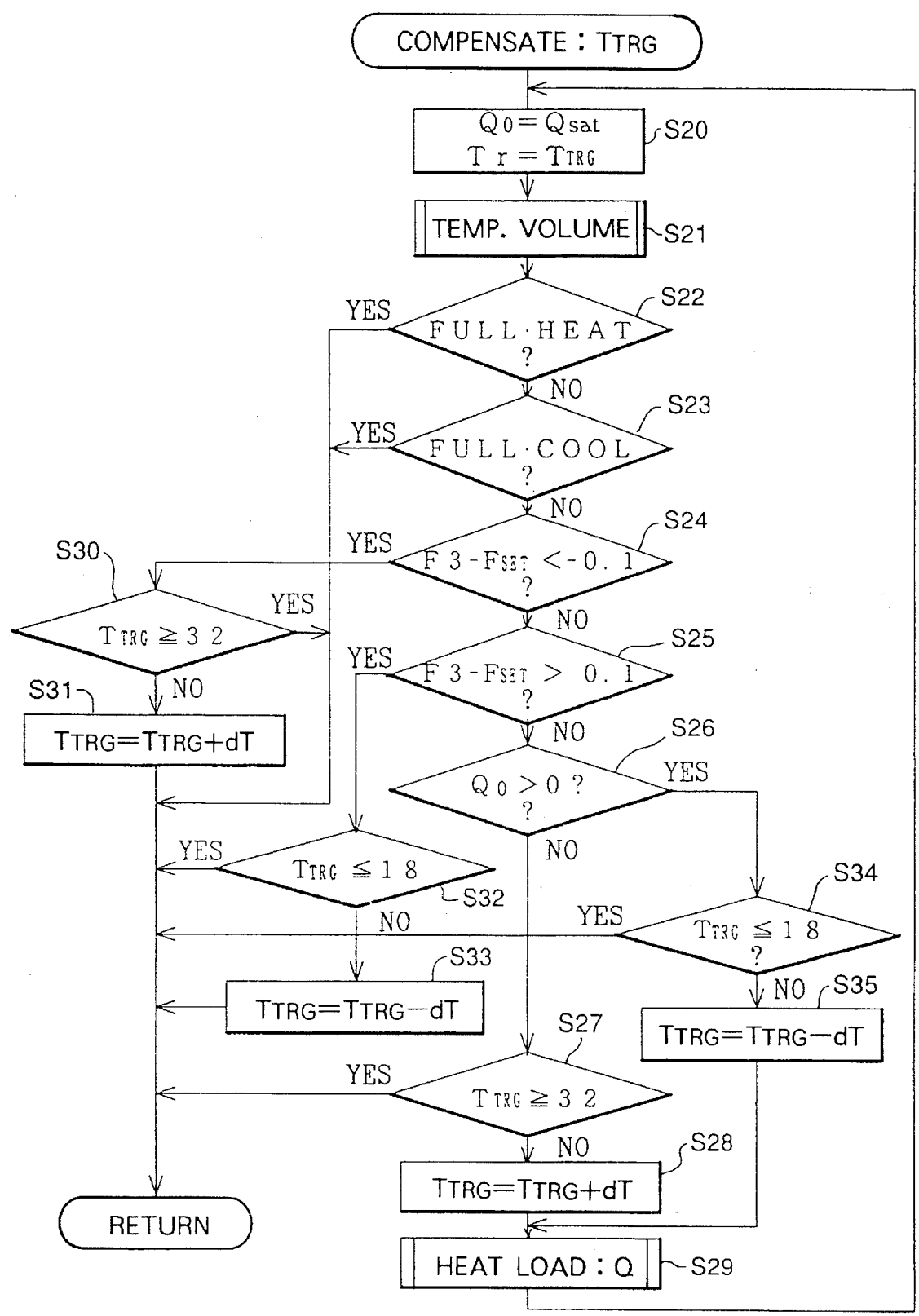
FIG. 7 is a flow chart which shows a subroutine for setting and compensating a target temperature.

FIG. 7 is a flow chart showing a routine for setting and compensating the target temperature TTRG.

The control device 22 sets a heat load Qo at a value Qsat in a stable or substantially constant condition and sets the target interior temperature TTRG as the interior temperature Tr detected by the interior temperature sensor 24 (S20, S21).

The heat load Qsat in the stable condition is a value of inference and calculated based on the outside temperature Ta detected by the outside temperature sensor 25, target temperature TTRG and heat load Qs due to the solar radiation by means of a formula as follows:

$$Qsat=ka(Ta-TTRG)+ks*Qs+C \qquad (7)$$

Wherein ka, ks, C are coefficients and constant which are predetermined based on a structure of the vehicle.

Further, the control device 22 calculates a desirable outlet air volume Va, outlet air temperature To of the heater-air-conditioner system based on the heat load Qsat and the target temperature TTRG (S21).

Where the system is in an operating condition other than the FULL.COOL mode and FULL.HEAT mode, the control device 22 calculates a deviation between the overall comfort index F3 and the target comfort index FSET (S22–S25). Where the deviation (F3–FSET) is smaller than –0.1, it is considered that the passenger feels cold strongly. In this case, if the interior temperature Tr is less than the allowable maximum value (32 degree centigrade), the control device 22 increases the target temperature TTRG by a predetermined increment dT (S24, S30 and S31). On the other hand, where the deviation (F3–FSET) is greater +0.1, it is considered that the passenger feels hot strongly. In this case, if the interior temperature Tr is greater than the allowable minimum value (18 degree centigrade), the target interior temperature TTRG is decreased by a predetermined decrement dT (S25, S32 and S33). Meanwhile, the FULL.COOL and FULL.HEAT modes are provided for exerting the cooling and heating function of the system at its full capacity. Under the FULL.COOL mode, the air mix damper 13 is set at the fully closed position (θ=0). The compressor is operated at its full load. On the other hand, under the FULL.HEAT mode, the air mixing damper 13 is fully opened (θ=1).

Where the deviation (F3–FSET) is in between –0.1 and +0.1 which means that The actual comfort index F3 is close to the target comfort index FSET, the control device 22 judges whether the heating operation condition or cooling operating condition is established with regard to the air conditioning factor and the environmental factor based on the value of the heat load Qo. Namely, when the value of the heat load Qo is negative, in other words, when the heating operating condition is established and when the target temperature is lower than the maximum value (32 degree centigrade), the target temperature TTRG is increased by a predetermined increment dT (S26, S27 and S28) and then a calculation of heat load of the system is carried out (S29). The heat load calculated can be expressed by the following formula:

$$Q = ka(Ta - TTRG) + ks*Ts + kr(Tr - TTRG) + C \qquad (8)$$

Wherein ka, ks, kr are coefficients based on the structure of the vehicle and C is constant.

When the value of the heat load Qo is positive, in other words, when the cooling operating condition is established and when the target temperature is greater than the minimum value (18 degree centigrade), the target temperature TTRG is decreased by a predetermined decrement dT (S26, S34 and S35) and then a calculation of a heat load of the system is carried out (S29).

Figure 8:
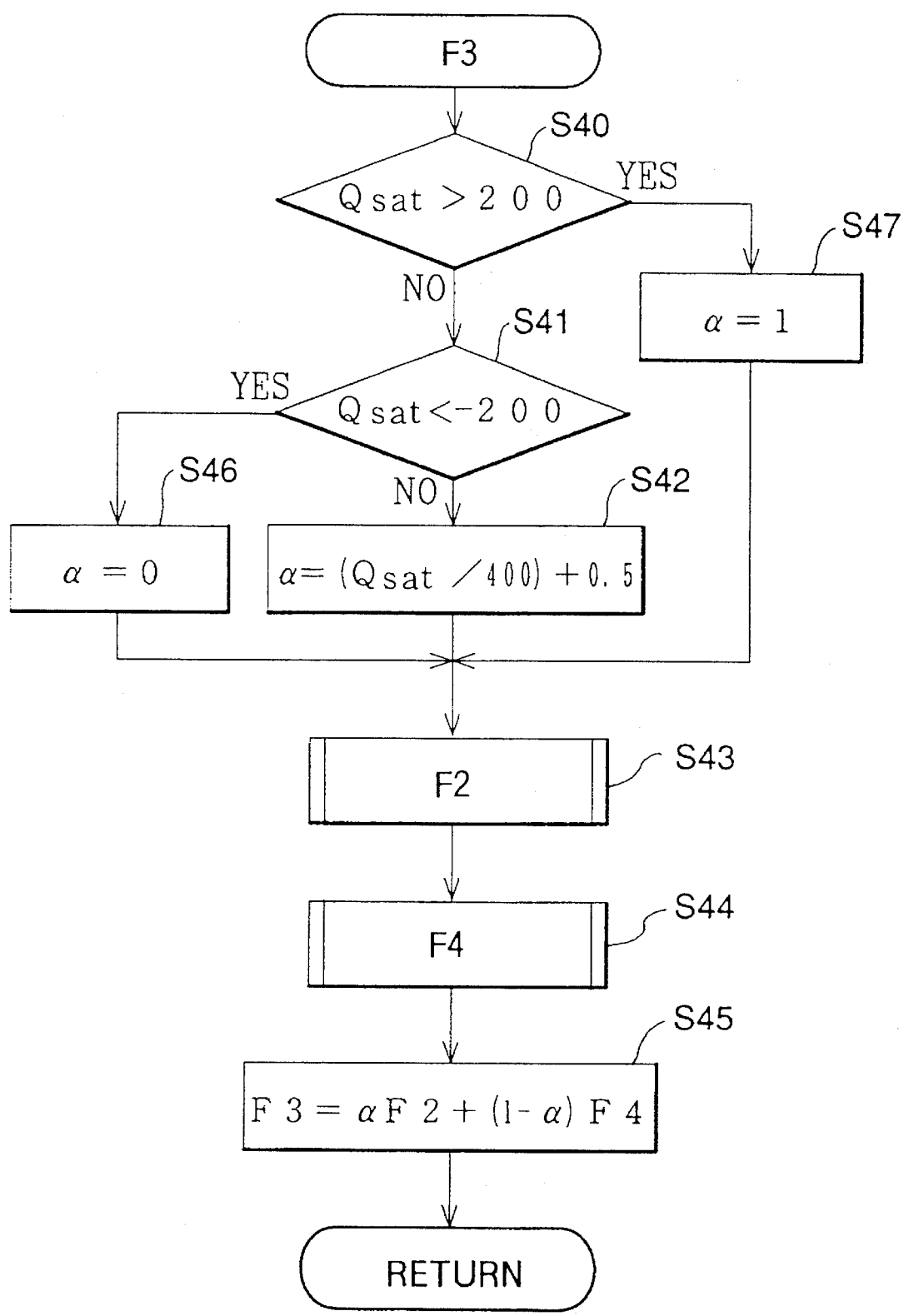
FIG. 8 is a flow chart of a subroutine for calculating the overall comfort index.

FIG. 8 is a flowchart showing a subroutine for calculating the overall comfort index F3.

The control device 22 provides a coefficient $\alpha$ with a value expressed by a formula: (Qsat/400)+0.5 where the heat load Qsat is in between +200 kcal and –200 kcal, and calculates the coefficient $\alpha$(S40, S41 and S42). Thereafter, the control device 22 calculates the comfort indexes F2 and F4 (S43 and S44) by means of the formulas (5) and (6).

Further, the control device 22 calculates the overall comfort index F3 by using the following formula:

$$F3 = \alpha * F2 + (1-\alpha)F4 \qquad (9)$$

Thus, the overall comfort index F3 is obtained based on the comfort index F2 mainly focusing the upper body portion of the passenger and the comfort index F4 mainly focusing the lower body portion of te passenger. The coefficient $\alpha$ is a weight coefficient between the comfort indexes F2 and F4.

Where the heat load Qsat is greater than +200 kcal, the coefficient is set at 1 (S40 and S47). In this case, the overall comfort index F2 accords with the comfort index F2 (S45), on the other hand, where the heat load Qsat is less than –200 kcal, the coefficient is set at 0 (S41, S46) and thus, the overall comfort index F3 accords with the comfort index F4 (S45).

Figure 16:
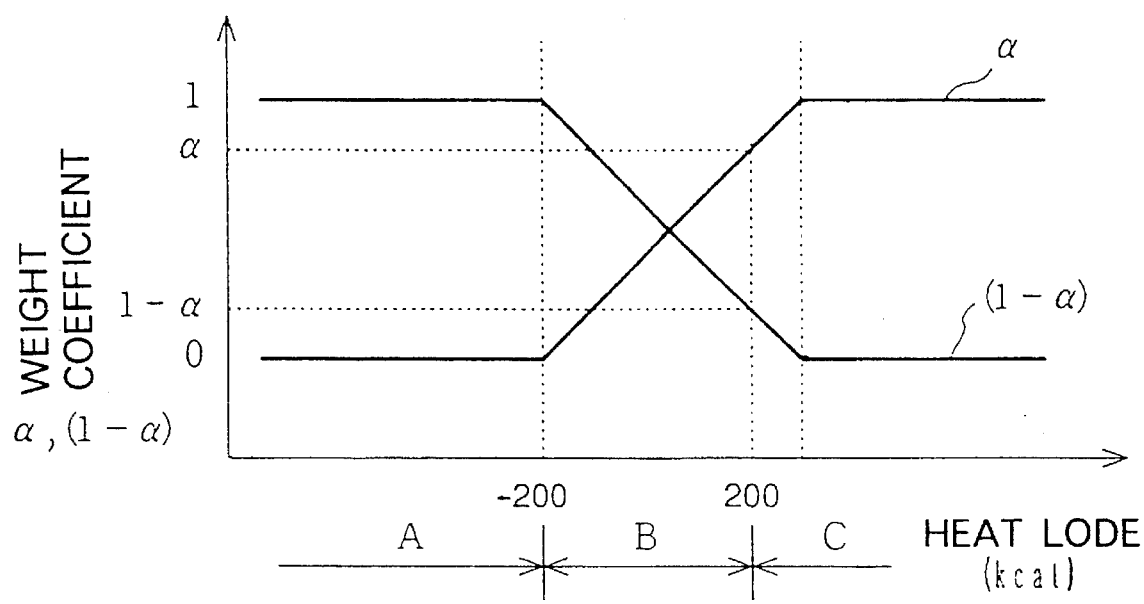
FIG. 16 is a chart for obtaining a coefficient α which is used for calculating the overall comfort index.

FIG. 16 is an illustrative chart for determining a value of the coefficient $\alpha$. In the illustrative embodiment shown in FIG. 16, the coefficient $\alpha$ is provided as a function expressed by a formula: Qsat=ka(Ta–TTRG)+ks*Qs+C. Where the heat load Qsat is less than –200 kcal (area A), the coefficient $\alpha$ for the comfort index F2 is set at 0 and the weight value (1–$\alpha$) for the comfort index F4 is set at 1. On the other hand, where the heat load Qsat is greater than +200 kcal (area C), the coefficient $\alpha$ for the comfort index F2 is set at 1 and the weight value (1–$\alpha$) for the comfort index F4 is set at 0. Where the heat load Qsat is in between the +200 kcal and –200 kcal (area B), the weight coefficient $\alpha$ is gradually increased in proportion to the heat load Qsat and thus the value (1–$\alpha$) is gradually decreased in inverse proportion to the heat load Qsat.

Figure 9:
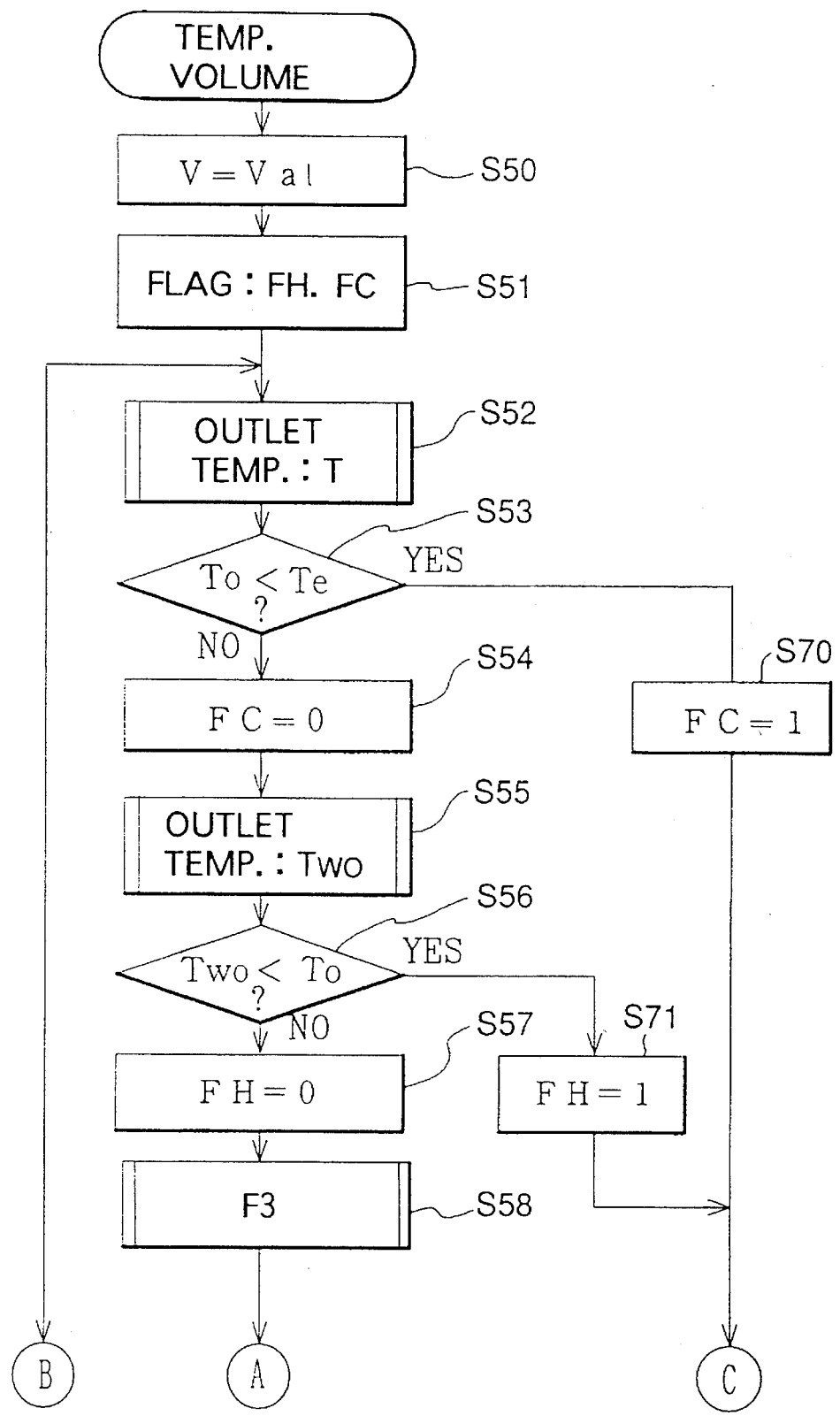
FIG. 9 is a flow chart which shows a front part of subroutine for setting a target outlet air temperature and a target outlet air volume.
Figure 10:
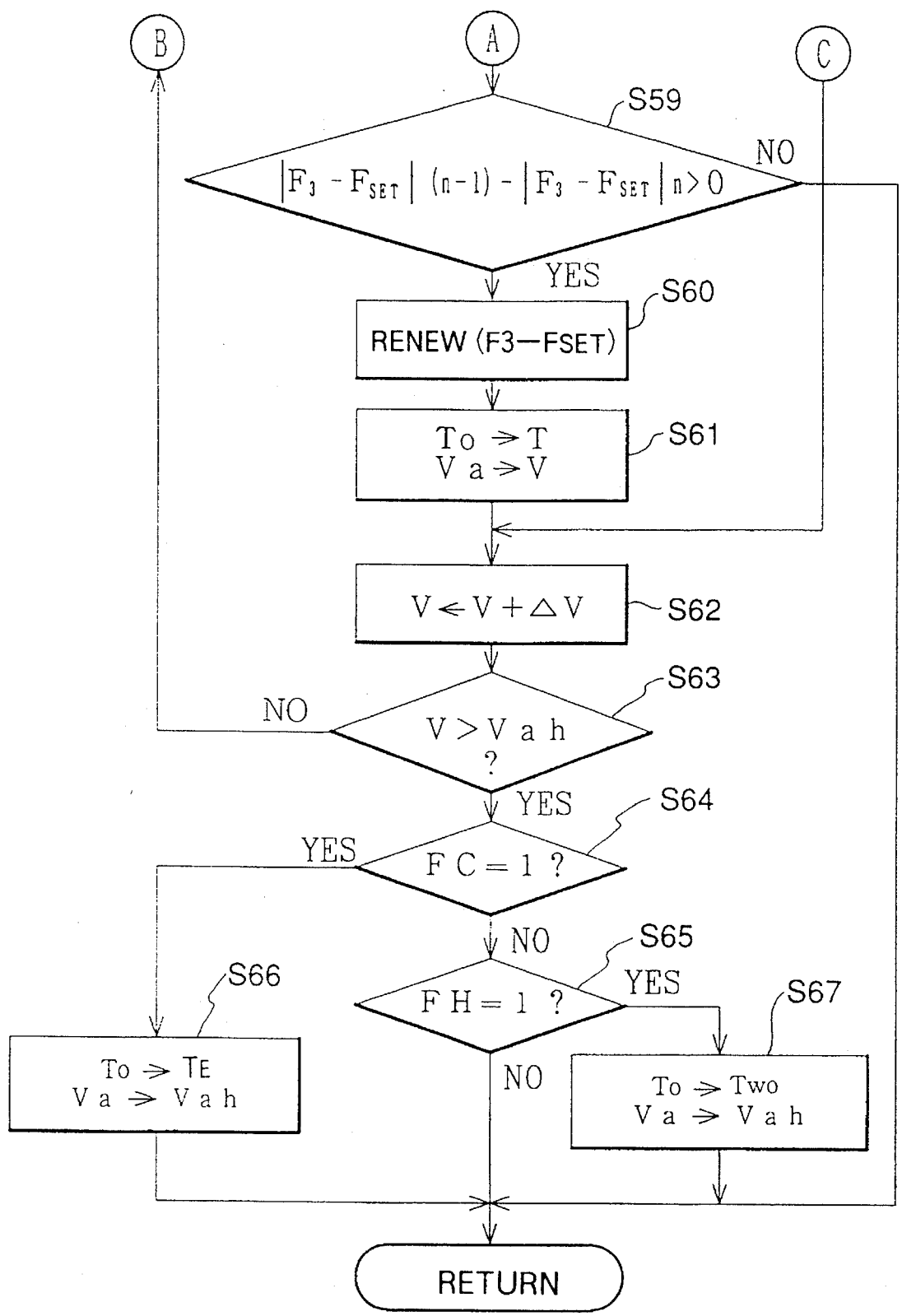
FIG. 10 is a flow chart which shows a latter part of the subroutine for setting the target outlet air temperature and the target outlet air volume.

FIGS. 9 and 10 are flow charts of subroutines for obtaining the outlet air volume Va and outlet air temperature To.

The control device 22 increases the outlet air volume V stepwise by an increment dVa from the minimum value Val to maximum value Vah, calculates the overall comfort index F3 for the cooling operation based on every outlet air volume V calculated, and determines a target outlet air volume Va and a target outlet air temperature To which can provide an optimized overall comfort index F3 which minimizes the deviation from the target comfort index FSET.

First, the control device 22 provides the outlet air volume V with an allowable minimum delivery of the blower 11 (S50) and set flags FH, FC at an initial value 0 (S51). The flag values FH=1, FC=1 indicate the FULL.HEAT and FULL.COOL modes respectively.

The control device 22 calculates the outlet air temperature T (S52). The outlet temperature T can be obtained based on the heat load Q, outlet air volume V and interior temperature Tr as follows:

$$T = -(Q/0.28V) + Tr \qquad (10)$$

Next, the control device 22 calculates the overall comfort index F3 after judging whether or not the outlet air temperature T is within a predetermined range. In detail, when the outlet air temperature T is lower than the minimum temperature TE which is obtainable by the virtue of the heating operation of the heat-air-conditioner system, the flag is set at 0 (S53 and S54). Further, where the outlet air temperature T is lower than the maximum temperature Two which is obtainable by virtue of the cooling operation of the system, the flag FH is set at 0 (S55, S56 and S57). Thereafter, the control device 22 calculates the overall comfort index F3 (S58). This calculation is made in accordance with the above formula (9).

Generally, the minimum temperature TE is determined based on the cooling capacity of the cooling heat-exchanger 12. When the outlet air temperature T is lower than the minimum temperature TE, the flag FC is set at 1 and the FULL.COOL mode is selected (S53, S70). The maximum temperature Two is generally set at the engine coolant temperature Tw. When the outlet air temperature To is higher than the maximum temperature Two, the flag FH is set at 1 and the FULL.HEAT mode is selected (S56, S71).

The control device further judges whether or not the deviation between the overall comfort index F3 and the target comfort index FSET is increased (S59). Where the deviation is being reduced, in other words when a value of an absolute value (F3–FSET)$_{(n-1)}$–absolute value (F3–FSET)$_n$ is positive, the control device 22 stores the value (F3–FSET) and renews the value (F3–FSET)(S60). The control device 22 stores the target outlet air volume Va the target outlet temperature To in RAM (S61).

Next, the control device 22 increases the outlet air volume V by a predetermined increment dV and judges whether or not the increased value V of the outlet air volume is less than the maximum delivery volume Vah of the blower 11. If the target outlet air volume Va is not greater than the maximum value Vah, the judgment and calculation from step S52 to S61 is repeated (S63). Consequently, the optimized combination of the target outlet air temperature To and target outlet air volume Va which can minimize the deviation of the overall comfort index F3 from the target comfort index FSET within the air conditioning capacity of the heater-air-conditioner system.

The control device 22 terminates the judgment and the calculation of the outlet air temperature and volume T and V in steps S52–S62 and judges the flags FC and FH. When the flag FC is 1 or when the FULL.COOL mode is selected, the target air volume To is set at the minimum temperature TE obtainable by the system and the target outlet air volume Va is set at the maximum value Vah (S64 and S66). Thus, the system is operated at its full cooling capacity. When the flag FH is 1, in other words, when the FULL.HEAT mode is selected, the target outlet air To is set at the maximum temperature Two obtainable by the system and the target outlet air volume Va is set at the maximum value Vah (S65 and S67). Therefore, the heat-air-conditioner system is operated at its full heating capacity. When the flags FC and FH are 0, the air flow mode setting routine shown in FIG. 11 is carried out (S63, S64 and S65).

Figure 11:
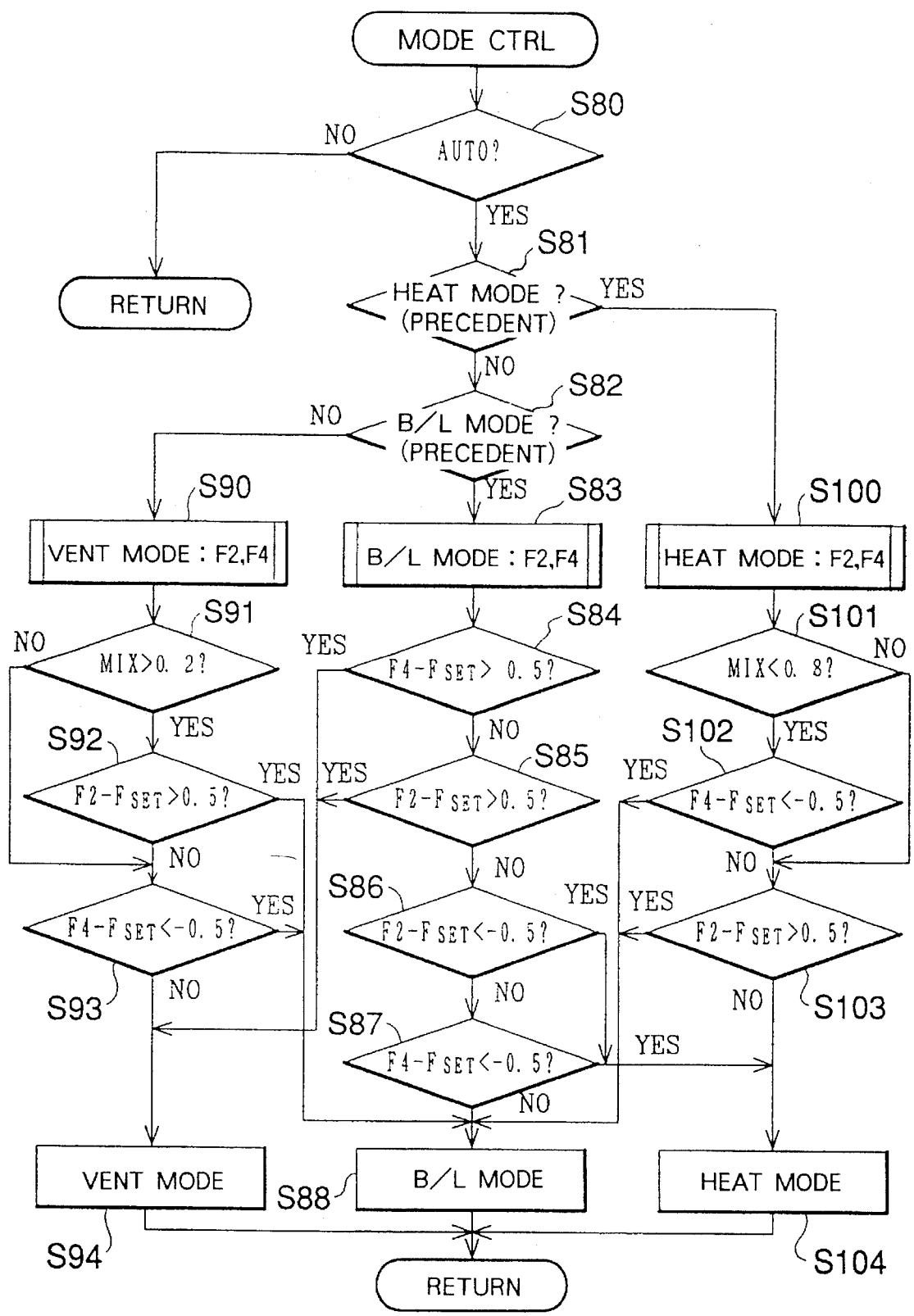
FIG. 11 is a flow chart which shows a subroutine for automatically setting an air flow mode.
Figure 13:
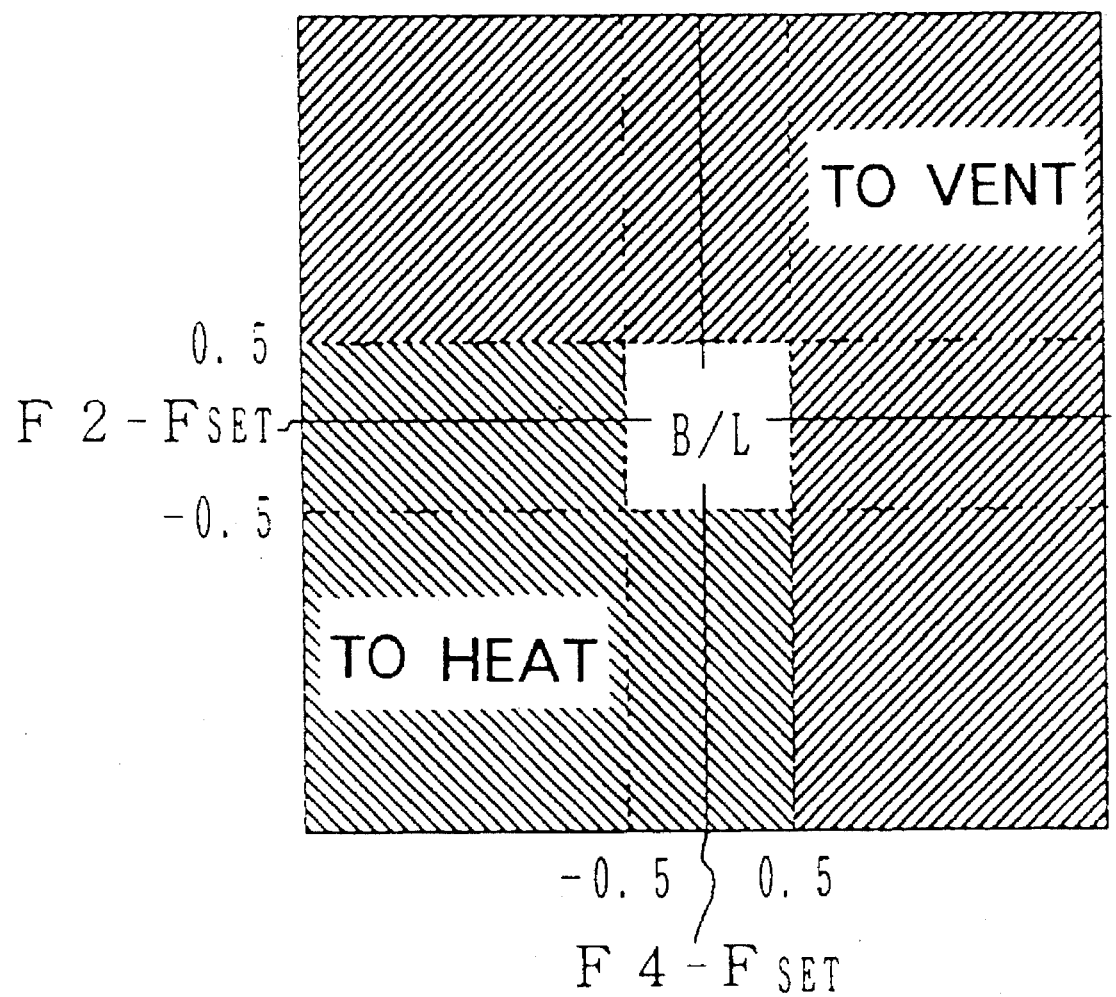
FIG. 13 is a chart showing how to determine the air flow mode.

FIG. 11 is a flow chart of a subroutine for automatically setting the airflow mode. FIGS. 12 to 14 are charts for showing how to set the airflow mode.

When the automatic operating mode is selected by means of the switch 23a (S80), the control device 22 automatically and selectively sets the airflow mode at a vent mode, B/L mode or heat mode in accordance with the comfort indexes F2 and F4. In the vent mode, the outlet air from the system mainly flows out of the vent outlet 5 by opening only the mode switching damper 8. Under the B/L mode, the conditioned air flows out of both the vent outlet 5 and foot outlet 6 with a predetermined ratio therebetween. Under the heat mode, the conditioned air mainly flows out of the foot outlet 6. In the heat mode, for example, 75% of the total air flows out of the foot outlet 6 and 25% thereof flows out of the defroster outlet 7.

The control device 22 calculates the comfort indexes F2 and F4 in the B/L mode and judges the deviation of the indexes F2 and F4 from the target comfort index FSET (S81, S82, S83 and S84–S87). When the deviation of the index F4 from the target value FSET is in a range from −0.5 to +0.5 and when the deviation of the index F4 from the target value FSET is in a range from −0.5 to +0.5, the B/L mode is maintained (S84, S85, S86, S87 and S88). On the other hand, if the deviation of the index F4 from the target value FSET is greater than +0.5, it is considered that the passenger feels hot in the lower body portion, e.g. in his legs. Likewise, if the deviation of the index F2 from the target value FSET is greater than +0.5, it is considered that the passenger feels hot in the upper body portion, e.g. in his head. In view of this, when either the deviation of the index F2 or F4 from the target value FSET is greater than +0.5, the control device 22 switches the airflow mode to the vent mode in which the conditioned air flows out of the vent outlet 5 (S84, S85 and S94).

If the deviation of the index F2 from the target value FSET is less than −0.5, it is considered that the passenger feels cold in the upper body portion, e.g. in his head. Likewise, if the deviation of the index F4 from the target value FSET is less than −0.5, it is considered that the passenger feels cold in the lower body portion, e.g. in his legs. In view of this, when either the deviation of the index F2 or F4 from the target value FSET is less than −0.5, the control device 22 switches the airflow mode to the heat mode in which the conditioned air mainly flows out of the foot outlet 6 (S86, S87 and S104).

FIG. 13 shows how to determine the airflow mode in accordance with the above mentioned routine. In the drawing, the B/L mode is switched to another airflow mode when the above mentioned condition falls into a hatched area.

In the vent mode, the control device 22 judges the opening θ of the air mixing damper 13 after calculating the comfort indexes F2 and F4 (S81, S82 and S90). Then, the control device judges whether or not the deviations of the indexes F2 and F4 from the target value FSET are greater than +0.5 or less than −0.5 respectively. In detail, if the deviation of the index F2 from the target value FSET is not greater than +0.5 and if the deviation of the index F4 from the target value FSET is not smaller than −0.5, the vent mode is maintained (S92, S93 and S94). On the other hand, if the opening θ of the air mixing damper 13 is greater than 0.2 and if the deviation of the index F2 from the target value FSET is greater than +0.5, or if the deviation of the index F4 from the target value FSET is less than −0.5, it is considered that the passenger feels hot in his upper body portion, otherwise, the passenger feels cold in his lower body portion. In this case, the control device 22 switches the air-flow mode from the vent mode to the B/L mode in which the conditioned air flows out of both the vent outlet 5 and the foot outlet 6 (S92, S93 and S88).

FIG. 12 shows how to determine the airflow mode in accordance with the above mentioned routine. In FIG. 12(A), the hatched portion shows an area where the vent mode is to be switched to the B/L mode in the case where the opening θ of the air mixing damper is greater than 0.2 and thus a relatively greater amount of the conditioned air passes through the heating heat-exchanger 14.

In FIG. 12(B), the hatched portion shows an area where the vent mode is to be switched to the B/L mode in the case where the opening θ of the air mixing damper is not greater than 0.2.

Further, in the heat mode, the control device 22 judges the opening θ of the air mixing damper 13 after calculating the comfort indexes F2 and F4 (S81, S82 and S101). Then, the control device judges whether or not the deviations of the indexes F2 and F4 from the target value FSET are greater than +0.5 or less than −0.5 respectively. In detail, if the deviation of the index F2 from the target value FSET is not greater than +0.5 and if the deviation of the index F4 from the target value FSET is not smaller than −0.5, the heat mode is maintained (S102, S103 and S104). On the other hand, if the opening θ of the air mixing damper 13 is smaller than 0.8 and if the deviation of the index F2 from the target value FSET is less than −0.5, or if the deviation of the index F4 from the target value FSET is greater than +0.5, it is considered that the passenger feels hot in his lower body portion, otherwise, the passenger feels cold in his upper body portion. In this case, the control device 22 switches the airflow mode from the heat mode to the B/L mode in which the conditioned air flows out of both the vent outlet 5 and the foot outlet 6 (S102, S102, S103 and S88).

FIG. 14 shows how to determine the airflow mode in accordance with the above mentioned routine. In FIG. 14(A), the hatched portion shows an area where the heat mode is to be switched to the B/L mode in the case where the opening θ of the air mixing damper is smaller than 0.8 and thus a relatively greater amount of the conditioned air flows by-passing the heating heat-exchanger 14.

In FIG. 14(B), the hatched portion shows an area where the vent mode is to be switched to the B/L mode in the case where the opening θ of the air mixing damper is greater than 0.8.

Figure 15:
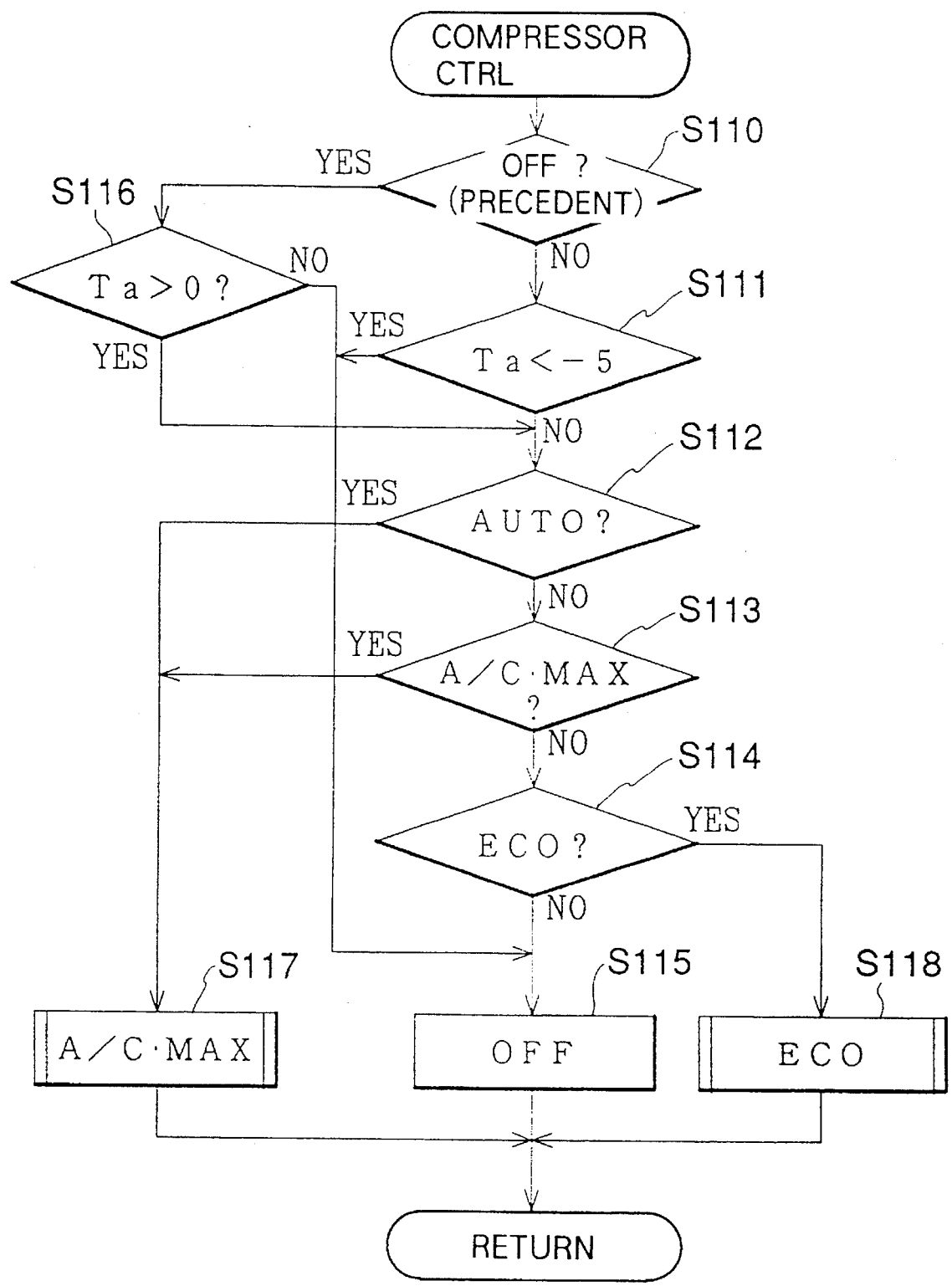
FIG. 15 is a flow chart of a subroutine for controlling a compressor.

FIG. 15 shows a flow chart of a subroutine for controlling the compressor.

The control device 22 stops the compressor 15 where the ambient temperature Ta is lower than 0 degree centigrade and keeps the compressor 15 stopped where the ambient temperature Ta is lower than −5 degree centigrade (S110, S111, S116 and S115). The control device 22 judges whether or not the automatic operation mode is selected from the switch 23a and whether or not the compressor is in operation (S112). If an automatic operation mode is selected or if the compressor 15 is actually being operated at its full capacity, the compressor 15 is controlled to be operated under the full operation mode (A/C.MAX) (S112, S113 and S117). On the other hand if the automatic operation mode is not selected and if the compressor is not operated at its full capacity, the control device judges whether or not the compressor is operated under an economy mode (ECO). If the compressor 15 is operated under the economy mode, the compressor maintains the economy mode (S114 and S118). To the contrary, if the compressor 15 is operated not based on the economy mode, the control device 22 stops the compressor 15 (S114 and S115). In this case, the compressor stops when a magnetic clutch 31 therefor is released. In the full operation mode (A/C.MAX), the magnetic clutch 31 is released when the outlet temperature Te of the cooling heat exchanger 12 is not greater than a predetermined value Te' and is engaged when the temperature Te is not smaller than another predetermined temperature Te" (Te">Te'). In the economy mode, the predetermined temperature Te' and Te" are changed depending on the outlet air temperature To.

As aforementioned, the control device 22 calculates the overall comfort index F3 which is a function of the air conditioning factor (outlet air volume Va, outlet air temperature To) and the environmental factor (outside temperature Ta, interior temperature Tr, solar radiation Ts), and the target comfort index FSET to which the overall comfort index F3 is controlled. The target comfort index FSET is changeably provided as a function of the set interior temperature TSET which can be manually changed by means of the set switch 23b. Thus, the value of the index FSET is calculated based on the set interior temperature TSET. The control device further determines the optimized combination of the target outlet air volume Va and the target outlet air temperature To in a manner that the overall comfort index F3 is converged to the target comfort index FSET.

According to the above mentioned control, the target comfort index FSET can be manually determined based on the set interior temperature TSET which is set by the passenger. And the target outlet air Va and the target outlet temperature is selected so that the overall comfort index F3 is converged to the target comfort index FSET.

Thus, according to the above mentioned air conditioning control, the comfort which is actually sensed by the passenger can be effectively and precisely assessed and the optimized comfort can be accomplished based on the set interior temperature TSET which is manually determined by the passenger in terms of the comfort he feels.

The control device 22 compensates the target temperature TTRG stepwise by the increment or decrement dT when the deviation between the overall comfort index F3 and the target comfort index FSET is greater than a predetermined value. Namely, if the deviation is not reduced below the predetermined value irrespective of the air conditioning control, the target temperature TSET is compensated so that the overall comfort can be quickly controlled to the target comfort index FSET.

In another aspect of the invention, the control device 22 changes the airflow mode of the heater-air-conditioner system where the deviation is not reduced below the predetermined value irrespective of the air conditioning control so that the airflow pattern is changed to accomplish the target comfort FSET quickly.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. An air conditioning control method of a vehicle comprising:
   determining a target temperature of a passenger compartment of the vehicle,
   calculating a comfort index provided as a function of at least an outlet air temperature and outlet air volume flowing out of a heater-air-conditioner system in which air is treated to be introduce to a passenger compartment,
   setting a target comfort index,
   determining an optimized combination of the output air temperature and the output air volume which minimizes a deviation of the comfort index from the target comfort index,
   compensating the target temperature to reduce the deviation when the deviation is greater than a predetermined value.

2. A method as recited in claim 1 wherein the target comfort index is changeable as a function of a set interior temperature.

3. A method as recited in claim 1 where an airflow mode of the output air from the heater-air-conditioner system is changed where the deviation is not reduced below the predetermined value irrespective of the compensation of the target temperature.

4. A method as recited in claim 1 wherein the comfort index is calculated as a function of air conditioning factor and an environmental factor.

5. A method as recited in claim 1 wherein the comfort index F is calculated by the following formula:

$$F=K1*Va+K2*To+K3*Ta+K4*Tr+K5*Ts+K6$$

wherein

Va:outlet air volume to a passenger compartment,

To:outlet air temperature to the passenger compartment,

Ta:ambient (outside) air temperature,

Tr:interior temperature of a passenger compartment,

Ts:solar radiation value,

K1 through K6: weighting coefficients for the respective variables Va, To, Ta, Tr and Ts.

6. A method as recited in claim 3 wherein the airflow mode in an air cooling operation of the heater-air-conditioner system is different from that in an air heating operation of the system.

7. A method as recited in claim 6 wherein a comfort index F2 in the air cooling operation of the heater air-conditioner system is provided by the following formula:

$$F2=K11*Va+K21*To+K31*Ta+K41*Tr+K51*Ts+K61$$

Wherein

K11–K61 are weight coefficients.

8. A method as recited in claim 6 wherein a comfort index F4 in the air heating operation of the heater air-conditioner system is provided by the following formula:

$$F4=K12*Va+K22*To+K32*Ta+K42*Tr+K52*Ts+K62$$

wherein

K12–K62 are weight coefficients.

9. A method as recited in claim 6 wherein comfort indexes F2 and F4 in the air cooling operation and air heating operation of the heater air-conditioner system are provided respectively by the following formulas:

$$F2=K11*Va+K21*To+K31*Ta+K41*Tr+K51*Ts+K61,$$

$$F4=K12*Va+K22*To+K32*Ta+K42*Tr+K52*Ts+K62$$

wherein K11–K61 and K12–K62 are weight coefficients, and wherein an overall comfort index F3 is provided as follows;

$$F3=\alpha*F2+(1-\alpha)F4,$$

Wherein

θ:weight coefficient.

10. A method as recited in claim 3 wherein the airflow mode is selectively established among a vent mode in which the air from the heater-air-conditioner system mainly flows out of an upper outlet of the system, a heat mode in which the air mainly flows out of a lower outlet and a B/L mode in which the air flows out of both the upper outlet and lower outlet with a predetermined ratio therebetween.

11. A method as recited in claim 9 wherein the airflow mode is selectively established among a vent mode in which the air from the heater-air-conditioner system mainly flows out of an upper outlet of the system, a heat mode in which the air mainly flows out of a lower outlet and a B/L mode in which the air flows out of both the upper outlet and lower outlet with a predetermined ratio therebetween.

12. A method as recited in claim 10 wherein the airflow mode is switched to the vent mode when either the deviation of the index F2 or F4 from the target comfort index is greater than a predetermined value.

13. A method as recited in claim 10 wherein the airflow mode is switched to the heat mode when either the deviation of the index F2 or F4 from the target comfort index is less than a predetermined value.

14. A method as recited in claim 10 where the vent mode is maintained, if the deviation of the index F2 from the target comfort index is not greater than a predetermined value and if the deviation of the index F4 from the target comfort index is not smaller than a predetermined value.

15. A method as recited in claim 10 wherein the airflow mode is switched from the vent mode to the B/L mode in accordance with an opening of a damper which controls an air flow rate between a heater and an air conditioner of the system in a case where the deviation of the comfort index F2 from the target comfort index is greater than a predetermined value.

16. A method as recited in claim 10 wherein the airflow mode is switched from the vent mode to the B/L mode in accordance with an opening of a damper which controls an air flow rate between a heater and an air conditioner of the system in a case where the deviation of the comfort index F4 from the target comfort index is greater than a predetermined value.

17. A method as recited in claim 10 wherein the airflow mode is switched from the heater mode to the B/L mode in accordance with an opening of a damper which controls an air flow rate between a heater and an air conditioner of the system in a case where the deviation of the comfort index F2 from the target comfort index is greater than a predetermined value.

18. A method as recited in claim 10 wherein the airflow mode is switched from the heater mode to the B/L mode in accordance with an opening of a damper which controls an air flow rate between a heater and an air conditioner of the system in a case where the deviation of the comfort index F4 from the target comfort index is greater than a predetermined value.

19. An air conditioning control apparatus of a vehicle comprising:

a target temperature determining device which determines a target temperature of a passenger compartment of the vehicle, a comfort index setting device which calculates a comfort index provided as a function of at least an outlet air temperature and outlet air volume flowing out of a heater-air-conditioner system in which air is treated to be introduce to a passenger compartment, a target comfort index setting device which sets a target value of the comfort index, an output setting device which determines an optimized combination of the output air temperature and the output air volume which minimizes a deviation of the comfort index from the target comfort index, a compensator which compensates the target temperature to reduce the deviation when the deviation is greater than a predetermined value.

20. An apparatus as recited in claim 19 wherein the target comfort index is changeable as a function of a set interior temperature.

21. An apparatus as recited in claim 19 where an airflow mode of the output air from the heater-air-conditioner system is changed where the deviation is not reduced below the predetermined value irrespective of the compensation of the target temperature.

22. An apparatus as recited in claim 19 wherein the comfort index is calculated as a function of an air conditioning factor and an environmental factor.

23. An apparatus as recited in claim 19 wherein the comfort index F is calculated by the following formula:

$$F=K1*Va+K2*To+K3*Ta+K4*Tr+K5*Ts+K6$$

Wherein

Va:outlet air volume to a passenger compartment,

To:outlet air temperature to the passenger compartment,

Ta:ambient (outside) air temperature,

Tr:interior temperature of a passenger compartment,

Ts:solar radiation value,

K1 through K6: weighting coefficients for the respective variables Va, To, Ta, Tr and Ts.

24. An apparatus as recited in claim 23 wherein the airflow mode in an air cooling operation of the heater-air-conditioner system is different from that in an air heating operation of the system.

25. An apparatus as recited in claim 24 wherein a comfort index F2 in the air cooling operation of the heater air-conditioner system is provided by the following formula:

$$F2=K11*Va+K21*To+K31*Ta+K41*Tr+K51*Ts+K61$$

Wherein

K11–K61 are weight coefficients.

26. An apparatus as recited in claim 24 wherein a comfort index F4 in the air heating operation of the heater air-conditioner system is provided by the following formula:

$$F4=K12*Va+K22*To+K32*Ta+K42*Tr+K52*Ts+K62$$

Wherein

K12–K62 are weight coefficients.

27. An apparatus as recited in claim 24 wherein comfort indexes F2 and F4 in the air cooling operation and air heating operation of the heater air-conditioner system are provided respectively by the following formulas:

$$F2=K11*Va+K21*To+K31*Ta+K41*Tr+K51*Ts+K61,$$

$$F4=K12*Va+K22*To+K32*Ta+K42*Tr+K52*Ts+K62$$

wherein K11–K61 and K12–K62 are weight coefficients, and wherein an overall comfort index F3 is provided as follows;

$$F3=\alpha*F2+(1-\alpha)F4,$$

Wherein

θ:weight coefficient.

28. An apparatus as recited in claim 21 wherein the airflow mode is selectively established among a vent mode in which the air from the heater-air-conditioner system mainly flows out of an upper outlet of the system, a heat mode in which the air mainly flows out of a lower outlet and a B/L mode in which the air flows out of both the upper outlet and lower outlet with a predetermined ratio therebetween.

29. An apparatus as recited in claim 27 wherein the airflow mode is selectively established among a vent mode in which the air from the heater-air-conditioner system mainly flows out of an upper outlet of the system, a heat mode in which the air mainly flows out of a lower outlet and a B/L mode in which the air flows out of both the upper outlet and lower outlet with a predetermined ratio therebetween.

30. An apparatus as recited in claim 29 wherein the airflow mode is switched to the vent mode when either the deviation of the index F2 or F4 from the target comfort index is greater than a predetermined value.

31. An apparatus as recited in claim 29 wherein the airflow mode is switched to the heat mode when either the deviation of the index F2 or F4 from the target comfort index is less than a predetermined value.

32. An apparatus as recited in claim 29 where the vent mode is maintained, if the deviation of the index F2 from the target comfort index is not greater than a predetermined value and if the deviation of the index F4 from the target comfort index is not smaller than a predetermined value.

33. An apparatus as recited in claim 29 wherein the airflow mode is switched from the vent mode to the B/L mode in accordance with an opening of a damper which controls an air flow rate between a heater and an air conditioner of the system in a case where the deviation of the comfort index F2 from the target comfort index is greater than a predetermined value.

34. An apparatus as recited in claim 29 wherein the airflow mode is switched from the vent mode to the B/L mode in accordance with an opening of a damper which controls an air flow rate between a heater and an air conditioner of the system in a case where the deviation of the comfort index F4 from the target comfort index is greater than a predetermined value.

35. An apparatus as recited in claim 29 wherein the airflow mode is switched from the heater mode to the B/L mode in accordance with an opening of a damper which controls an air flow rate between a heater and an air conditioner of the system in a case where the deviation of the comfort index F2 from the target comfort index is greater than a predetermined value.

36. An apparatus as recited in claim 29 wherein the airflow mode is switched from the heater mode to the B/L mode in accordance with an opening of a damper which controls an air flow rate between a heater and an air conditioner of the system in a case where the deviation of the comfort index F4 from the target comfort index is greater than a predetermined value.

* * * * *